US008364016B2

United States Patent
Mae et al.

(10) Patent No.: US 8,364,016 B2
(45) Date of Patent: Jan. 29, 2013

(54) INFORMATION PROCESSING APPARATUS, INFORMATION PROCESSING METHOD, AND COMPUTER PROGRAM

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation (JP)

( * ) Notice: Subject to any disclaimer, the term of this patent is extended or adjusted under 35 U.S.C. 154(b) by 798 days.

(21) Appl. No.: 11/988,600

(22) PCT Filed: May 7, 2007

(86) PCT No.: PCT/JP2007/059448
§ 371 (c)(1),
(2), (4) Date: Apr. 3, 2009

(87) PCT Pub. No.: WO2007/129683
PCT Pub. Date: Nov. 15, 2007

(65) Prior Publication Data
US 2009/0202229 A1    Aug. 13, 2009

(30) Foreign Application Priority Data
May 10, 2006 (JP) ................ P2006-132014

(51) Int. Cl.
*G06F 21/00* (2006.01)
(52) U.S. Cl. ...................................... 386/248
(58) Field of Classification Search ............. 386/248
See application file for complete search history.

(56) References Cited

U.S. PATENT DOCUMENTS 7,292,782 B2   11/2007  Sugahara et al.
2002/0064368 A1*  5/2002  Kikuchi et al. ............ 386/46
2003/0228134 A1  12/2003  Kim et al.
(Continued)

FOREIGN PATENT DOCUMENTS

EP    1193983 A2   4/2002
EP    1422945 A1   5/2004
(Continued)

OTHER PUBLICATIONS

Written Opinion from Corresponding SG Application No. 200800198-4, mailed Sep. 21, 2008.

(Continued)

*Primary Examiner* — Brandon Hoffman
*Assistant Examiner* — Anthony Brown
(74) *Attorney, Agent, or Firm* — Lerner, David, Littenberg, Krumholz & Mentlik, LLP

(57) ABSTRACT

An apparatus and a method for performing a data recording process that permits seamless playing are provided. An information processing apparatus such as a video camera records data in a manner that permits contents having discontinued recording timings to be played in a seamless fashion. To this end, the information processing apparatus acquires seamless information of a preceding record content to be applied to a recording process of a subsequent record content, and records the seamless information in a record file defined by a record format. For example, the seamless information is recorded in a clip information file. The seamless information remains recorded on an information recording medium as long as the content recorded on the information recording medium remains undeleted. The information processing apparatus can thus read and use the seamless information at any time. With this arrangement, the seamless information is reliably acquired and contents are always recorded in a manner that permits seamless playing.

18 Claims, 19 Drawing Sheets

U.S. PATENT DOCUMENTS

| | | |
|---|---|---|
| 2004/0101284 A1 | 5/2004 | Ando |
| 2006/0029366 A1 | 2/2006 | Park et al. |
| 2006/0050778 A1 | 3/2006 | Aridome et al. |
| 2006/0051066 A1 | 3/2006 | Aridome et al. |
| 2006/0083489 A1 | 4/2006 | Aridome et al. |
| 2007/0263976 A1* | 11/2007 | Park et al. .................. 386/46 |

FOREIGN PATENT DOCUMENTS

| | | |
|---|---|---|
| JP | 2002-112183 A | 4/2002 |
| JP | 2003061052 A | 2/2003 |
| JP | 2004-173069 A | 6/2004 |
| JP | 3675464 B2 | 7/2005 |
| JP | 3675465 B2 | 7/2005 |
| JP | 3807400 B2 | 8/2006 |
| WO | 2004053875 A2 | 6/2004 |

OTHER PUBLICATIONS

Office Action from Japanese Application No. 2006-132014, Jun. 7, 2011.

Supplementary European Search Report EP 07742883, dated Aug. 13, 2010.

* cited by examiner

FIG. 8

| Syntax | No. of bits | Mnemonic |
|---|---|---|
| zzzzz. clpi{ | | |
| type_indicator | 8*4 | bslbf |
| version_number | 8*4 | bslbf |
| SequenceInfo_start_address | 32 | uimsbf |
| ProgramInfo_start_address | 32 | uimsbf |
| CPI_start_address | 32 | uimsbf |
| ClipMark_start_address | 32 | uimsbf |
| ExtensionData_start_address | 32 | uimsbf |
| reserved_for_future_use | 96 | bslbf |
| ClipInfo() | | |
| for(i=0;i<N1;i++){ | | |
| padding_word | 16 | bslbf |
| } | | |
| SequenceInfo() | | |
| for(i=0;i<N2;i++){ | | |
| padding_word | 16 | bslbf |
| } | | |
| ProgramInfo() | | |
| for(i=0;i<N3;i++){ | | |
| padding_word | 16 | bslbf |
| } | | |
| CPI() | | |
| for(i=0;i<N4;i++){ | | |
| padding_word | 16 | bslbf |
| } | | |
| ClipMark() | | |
| for(i=0;i<N5;i++){ | | |
| padding_word | 16 | bslbf |
| } | | |
| ExtensionData() | | |
| for(i=0;i<N6;i++){ | | |
| padding_word | 16 | bslbf |
| } | | |
| } | | |

FIG. 9

| Syntax | No. of bits | Mnemonic |
|---|---|---|
| ClipExtensionData() { | | |
|   type_indicator | 8*4 | uimsbf |
|   reserved | 8*4 | bslbf |
|   ProgramInfoExt_start_address | 32 | uimsbf |
|   MakersPrivateData_start_address | 32 | uimsbf |
|   reserved_for_future_use | 192 | bslbf |
|   ClipInfoExt() | | |
|   for (i=0;i<N1;i++){ | | |
|     padding_word | 16 | bslbf |
|   } | | |
|   ProgramInfoExt() | | |
|   for (i=0;i<N2;i++){ | | |
|     padding_word | 16 | bslbf |
|   } | | |
|   MakersPrivateData() | | |
|   for (i=0;i<N3;i++){ | | |
|     padding_word | 16 | bslbf |
|   } | | |
| } | | |

FIG. 10

| Syntax | No. of bits | Mnemonic |
|---|---|---|
| ClipInfoExt() { | | |
|   length | 32 | uimsbf |
|   maker_ID | 16 | uimsbf |
|   maker_model_code | 16 | uimsbf |
| } | | |

FIG. 11

| Syntax | No. of bits | Mnemonic |
|---|---|---|
| MakersPrivateData() { | | |
|   length | 32 | uimsbf |
|   if(length !=0) { | | |
|     data_block_start_address | 32 | uimsbf |
|     reserved_for_word_align | 24 | bslbf |
|     number_of_maker_entries | 8 | uimsbf |
|     for (i=0;i<number_of_maker_entries;i++) { | | |
|       maker_ID | 16 | uimsbf |
|       maker_model_code | 16 | uimsbf |
|       mpd_start_address | 32 | uimsbf |
|       mpd_length | 32 | uimsbf |
|     } | | |
|     for (i=0<;i<L1;i++) { | | |
|       padding_word | 16 | bslbf |
|       padding_word | 16 | bslbf |
|     } | | |
|     data_block | 32+ 8 * (length− data_block_ start_address) | |
|   } | | |
| } | | |

| Syntax | No. of bits | Mnemonic |
|---|---|---|
| indexExtensionData() { | | |
|   type_indicator | 8*4 | uimsbf |
|   reserved | 8*4 | bslbf |
|   TableOfPlayLists_start_address | 32 | uimsbf |
|   MakersPrivateData_start_address | 32 | uimsbf |
|   reserved_for_future_use | 192 | bslbf |
|   UIAppinfoAVCHD() | | |
|   for (i=0;i<N1;i++) { | | |
|     padding_word | 16 | bslbf |
|   } | | |
|   TableOfPlayLists() | | |
|   for (i=0;i<N2;i++) { | | |
|     padding_word | 16 | bslbf |
|   } | | |
|   MakersPrivateData() | | |
|   for (i=0;i<N3;i++) { | | |
|     padding_word | 16 | bslbf |
|   } | | |
| } | | |

FIG. 13

| Syntax | No. of bits | Mnemonic |
|---|---|---|
| MakersPrivateData() { | | |
|   length | 32 | uimsbf |
|   if(length !=0) { | | |
|     data_block_start_address | 32 | uimsbf |
|     reserved_for_word_align | 24 | bslbf |
|     number_of_maker_entries | 8 | uimsbf |
|     for (i=0;i<number_of_maker_entries;i++) { | | |
|       maker_ID | 16 | uimsbf |
|       maker_model_code | 16 | uimsbf |
|       mpd_start_address | 32 | uimsbf |
|       mpd_length | 32 | uimsbf |
|     } | | |
|     for (i=0<;i<L1;i++) { | | |
|       padding_word | 16 | bslbf |
|       padding_word | 16 | bslbf |
|     } | | |
|     data_block | 32+ 8 * (length− data_block_ start_address) | |
|   } | | |
| } | | |

| Syntax | No. of bits | Mnemonic |
|---|---|---|
| PlayListExtensionData() { | | |
|   type_indicator | 8*4 | uimsbf |
|   reserved | 8*4 | bslbf |
|   PlayListMarkExt_start_address | 32 | uimsbf |
|   MakersPrivateData_start_address | 32 | uimsbf |
|   reserved_for_future_use | 192 | bslbf |
|   PlayListMeta() | | |
|   for (i=0;i<N1;i++){ | | |
|     padding_word | 16 | bslbf |
|   } | | |
|   PlayListMarkExt() | | |
|   for (i=0;i<N2;i++){ | | |
|     padding_word | 16 | bslbf |
|   } | | |
|   MakersPrivateData() | | |
|   for (i=0;i<N3;i++){ | | |
|     padding_word | 16 | bslbf |
|   } | | |
| } | | |

| Syntax | No. of bits | Mnemonic |
|---|---|---|
| MakersPrivateData() { | | |
|   length | 32 | uimsbf |
|   if(length !=0) { | | |
|     data_block_start_address | 32 | uimsbf |
|     reserved_for_word_align | 24 | bslbf |
|     number_of_maker_entries | 8 | uimsbf |
|     for (i=0;i<number_of_maker_entries;i++) { | | |
|       maker_ID | 16 | uimsbf |
|       maker_model_code | 16 | uimsbf |
|       mpd_start_address | 32 | uimsbf |
|       mpd_length | 32 | uimsbf |
|     } | | |
|     for (i=0<;i<L1;i++) { | | |
|       padding_word | 16 | bslbf |
|       padding_word | 16 | bslbf |
|     } | | |
|     data_block | 32+ 8 * (length− data_block_ start_address) | |
|   } | | |
| } | | |

| Syntax | No. of bits | Mnemonic |
|---|---|---|
| PlayListMarkExt() { | | |
|   length | 32 | uimsbf |
|   number_of_PlayList_makers | 16 | uimsbf |
|   for[PL_mark_id=0;<br>    PL_mark_id<number_of_PlayList_maks;<br>    PL_mark_id++]{ | | |
|     MakerExtension() { | | |
|       maker_ID | 16 | uimsbf |
|       maker_model_code | 16 | uimsbf |
|       reserved_for_future_use | 29 | bslbf |
|       pulldown | 2 | bslbf |
|       mark_write_protecting_flag | 1 | bslbf |
|       ref_to_mark_thumbnail_index | 16 | uimsbf |
|       time_zone | 8 | bslbf |
|       record_time_and_date | 4*14 | bslbf |
|       mark_character_set | 8 | uimsbf |
|       mark_name_length | 8 | bslbf |
|       mark_name | 8*24 | bslbf |
|       makers_information | 128 | bslbf |
|       TimeCode() | 32 | bslbf |
|       reserved_for_future_use | 16 | bslbf |
|     } | | |
|   } | | |
| } | | |

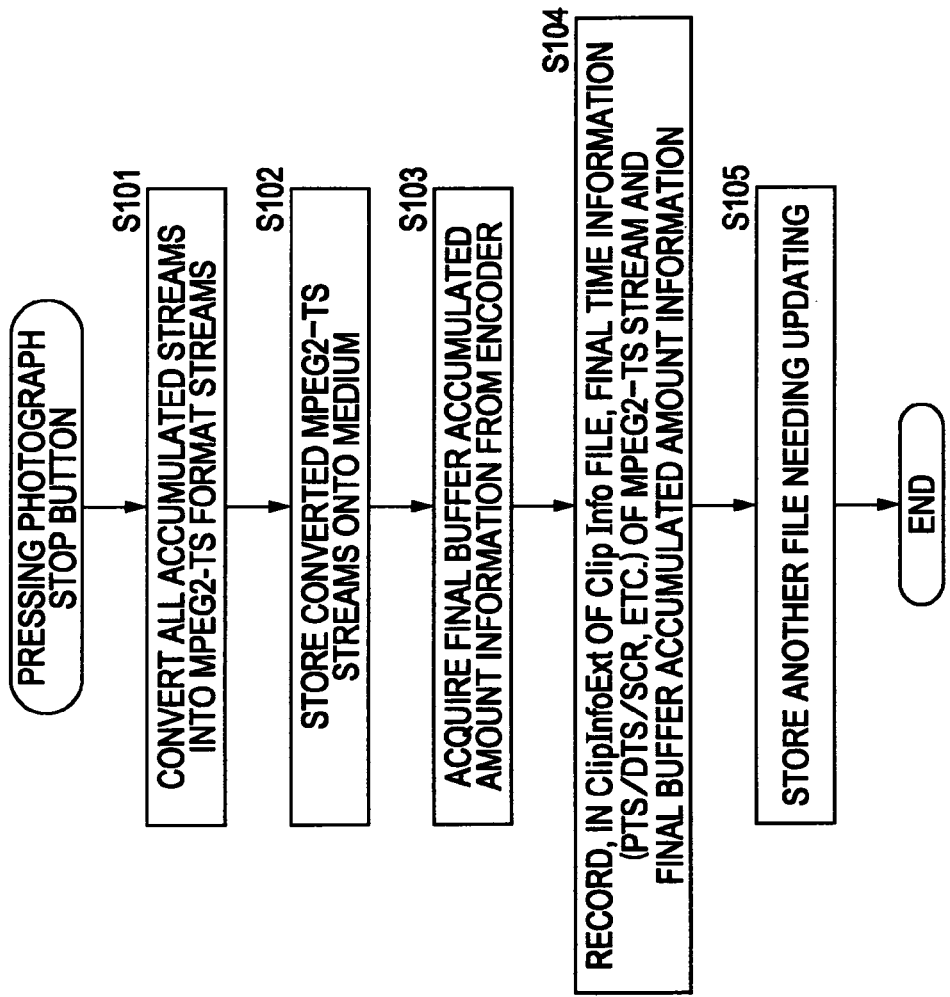

INFORMATION PROCESSING APPARATUS, INFORMATION PROCESSING METHOD, AND COMPUTER PROGRAM

CROSS REFERENCE TO RELATED APPLICATIONS

The present application is a national phase entry under 35 U.S.C. §371 of International Application No. PCT/JP2007/059448 filed May 7, 2007, published on Nov. 15, 2007 as WO 2007/129683 A1, which claims priority from Japanese Patent Application No. JP 2006-132014 filed in the Japanese Patent Office on May 10, 2006.

TECHNICAL FIELD

In a reading process or a playing process of a content stored on an information recording medium such as a disk, a data reading process from the information recording medium, an storage process of the read data onto a buffer in a codec, an acquisition and decoding process of acquiring accumulated data from the buffer in the codec and decrypting the acquired data are performed. The codec includes an encoder encoding data and a decoder decoding the encoded data. The codec thus performs an encoding process and a decoding process.

When the data read from the information recording medium is accumulated on the buffer in the codec, an overflow can occur on the internal buffer of the codec in the above series of process steps. For this reason, a control process is performed so that a preceding stream is reproduced first, followed by the reproduction of a subsequent stream. Under this process, play contents may be interrupted, in other words, freeze occurs.

If certain conditions are satisfied, continuous playing becomes possible without freezing across a plurality of streams. A play process for continuously playing a plurality of streams is referred to as seamless playing. One technique to perform seamless playing is a data recording process. In the data recording process, an encode operation for the seamless playing is performed when a video camera is used to take pictures.

More specifically, when contents are recorded at irregular timings, seamless information applicable to data recording is stored to perform the seamless playing. The seamless information contain buffer status information and time stamp at a record end point of a preceding record stream. When a subsequent stream is recorded, the seamless information is acquired. A codec performing an encode process at the start of recording the subsequent stream thus acquires the seamless information containing the buffer status information at the end of the recording of the preceding stream. The encode process is thus performed so that a predetermined buffer model may not be destroyed. The streams thus seamless playable can be recorded.

Information permitting seamless playing and applicable during data recording is referred to as seamless information.

The seamless information may be stored on a memory such as a RAM of an information processing apparatus such as a video camera. At the next data recording, the seamless information may be read so that seamless playable streams are recorded. Patent Documents 3 and 4 disclose techniques in which data is recorded in a manner such that the data may be seamless played with the buffer status information used.

In the known use of the seamless information, the seamless information of last recorded moving image is stored on a memory such as a RAM, and the seamless information is then referenced from the memory of the RAM. If last recorded stream is deleted or an information recording medium having stored the stream is removed (ejected) in such an arrangement, the seamless information corresponding to last recorded stream is deleted from the memory. In such a case, effect seamless information cannot be acquired at the recording of a next stream, and content recording cannot be performed in a seamless replayable manner.

[Patent Document 1]
 Japanese Patent 3675464

DISCLOSURE OF INVENTION

Problems to Be Solved by the Invention

In view of the above problems, the present invention has been developed, and it is an object of the present invention to provide an information processing apparatus, an information processing method and a computer program for recording seamless information for seamless playing in a data file defined by a content record format during data recording so that the seamless information remains always usable for playing the content in a seamless fashion.

It is also an object of the present invention to provide an information processing apparatus, an information processing method and a computer program for acquiring the seamless information from a clip information file to record a seamless playable content even when a last recorded stream is deleted, even when an information recording medium having stored a stream is removed (ejected) and then reloaded, or even when power is switched off once.

Means for Solving the Problems

In accordance with a first aspect of the present invention, an information processing apparatus for recording a record content onto an information recording medium, includes an encoder for performing an encoding operation on the record content, a data processor for performing a conversion operation for converting encoded data on the encoder into data having a predetermined record format, and a recording processor for recording onto the information recording medium the data having the predetermined record format converted by the data processor, in the recording of the record content having the predetermined record format to the information recording medium, the data processor acquiring predetermined seamless information applicable to a recording operation of a subsequent record content, and recording the seamless information in a record file defined by the record format.

In the information processing apparatus of one embodiment of the present invention, the seamless information may include accumulated data amount information of an internal buffer of the encoder at the end of a recording operation of a preceding record content.

In the information processing apparatus of one embodiment of the present invention, the seamless information may include time stamp information set in response to the record format generated by the data processor at the end of a recording operation of a preceding record content.

In the information processing apparatus of one embodiment of the present invention, the seamless information may include a presentation time stamp (PTS), and a decoding time stamp (DTS) and a system clock reference (SCR) as reference time information, each defined in the MPEG format.

In the information processing apparatus of one embodiment of the present invention, the record content may be AV stream data. The data processor may control the conversion operation, converting the AV stream data into data having the record format, the record format containing an AV stream file of AV stream data of a predetermined unit, an attribute file mapping play time information of the AV stream file to address information, and a play list file composed of at least one piece of play period data specifying a play period of the AV stream data by a start point and an end point, recording the converted AV stream data onto the information recording medium, and recording the seamless information in the attribute file.

In the information processing apparatus of one embodiment of the present invention, the record content may be AV stream data. The data processor may control the conversion operation, converting the AV stream data into data having the record format, the record format containing an AV stream file of AV stream data of a predetermined unit, an attribute file mapping play time information of the AV stream file to address information, and a play list file composed of at least one piece of play period data specifying a play period of the AV stream data by a start point and an end point, recording the converted AV stream data onto the information recording medium, and recording the seamless information in the play list file.

In the information processing apparatus of one embodiment of the present invention, the data processor may control the conversion operation, thereby recording the seamless information in an index file set in a directory for a content recording file on the information recording medium.

In the information processing apparatus of one embodiment of the present invention, the data processor may control the conversion operation, thereby recording the seamless information in a file, containing a set of commands for controlling playing and set in a directory for a content recording file on the information recording medium.

In the information processing apparatus of one embodiment of the present invention, the data processor may control the conversion operation, thereby recording the seamless information in a manufacturer-specific data area in a file set in a directory for a content recording file on the information recording medium.

In the information processing apparatus of one embodiment of the present invention, the data processor may perform an effectiveness verification process of the seamless information in the recording operation of the subsequent record content and control the recording operation in accordance with the seamless information on condition that the effectiveness of the seamless information has been verified.

In the information processing apparatus of one embodiment of the present invention, in the effectiveness verification process of the seamless information, the data processor may acquire, from a file in a directory for a content recording file on the information recording medium, identification information regarding an information processing apparatus having performed the recording process of the seamless information, determine whether the identification information matches identification information of own apparatus and determine that the seamless information is effective if the identification information matches the identification of own apparatus.

In the information processing apparatus of one embodiment of the present invention, in the effectiveness verification process of the seamless information, the data processor may perform an error detection operation in accordance with an error detection code set in a storage file of the seamless information and determine that the seamless information is effective if the file has been verified to be error free or alteration free.

In accordance with a second aspect of the present invention, an information processing method of an information processing apparatus for recording a record content onto an information recording medium, includes an encoding step of performing an encoding operation on the record content with an encoder, a data processing step of performing, with a data processor, a conversion operation for converting the data encoded in the encoding step into data having a predetermined record format, a record processing step of recording onto the information recording medium, with a record processor, the data having the predetermined record format converted in the data processing step, and in the recording of the record content having the predetermined record format to the information recording medium, a seamless information recording control step of the data processor of acquiring predetermined seamless information applicable to a recording operation of a subsequent record content, and recording the seamless information in a record file defined by the record format.

In the information processing method of one embodiment of the present invention, the seamless information may include accumulated data amount information of an internal buffer of the encoder at the end of a recording operation of a preceding record content.

In the information processing method of one embodiment of the present invention, the seamless information may include time stamp information set in response to the record format generated by the data processor at the end of a recording operation of a preceding record content.

In the information processing method of one embodiment of the present invention, the seamless information may include a presentation time stamp (PTS), and a decoding time stamp (DTS) and a system clock reference (SCR) as reference time information, each defined in the MPEG format.

In the information processing method of one embodiment of the present invention, the record content may be AV stream data. The data processing step may include controlling the conversion operation, by converting the AV stream data into data having the record format, the record format containing an AV stream file of AV stream data of a predetermined unit, an attribute file mapping play time information of the AV stream file to address information, and a play list file composed of at least one piece of play period data specifying a play period of the AV stream data by a start point and an end point, and by recording the converted AV stream data onto the information recording medium. The seamless information recording control step may include recording the seamless information in the attribute file.

In the information processing method of one embodiment of the present invention, the record content may be AV stream data. The data processing step may include controlling the conversion operation, by converting the AV stream data into data having the record format, the record format containing an AV stream file of AV stream data of a predetermined unit, an attribute file mapping play time information of the AV stream file to address information, and a play list file composed of at least one piece of play period data specifying a play period of the AV stream data by a start point and an end point, and by recording the converted AV stream data onto the information recording medium. The seamless information recording control step includes recording the seamless information in the play list file.

In the information processing method of one embodiment of the present invention, the seamless information recording control step may include controlling the conversion operation, by recording the seamless information in an index file set in a directory for a content recording file on the information recording medium.

In the information processing method of one embodiment of the present invention, the seamless information recording control step may include controlling the conversion operation, by recording the seamless information in a movie object file in a directory for a content recording file on the information recording medium.

In the information processing method of one embodiment of the present invention, the seamless information recording control step may include controlling the conversion operation, by recording the seamless information in a manufacturer-specific data area in a file set in a directory for a content recording file on the information recording medium.

The information processing method of one embodiment of the present invention may further include a content recording control step for performing, with the data processor, an effectiveness verification process of the seamless information in the recording operation of the subsequent record content and performing a content recording control operation in accordance with the seamless information on condition that the effectiveness of the seamless information has been verified.

In the information processing method of one embodiment of the present invention, in the effectiveness verification process of the seamless information, the seamless information recording control step may include acquiring, from a file in a directory for a content recording file on the information recording medium, identification information regarding an information processing apparatus having performed the recording process of the seamless information, determining whether the identification information matches identification information of own apparatus and determining that the seamless information is effective if the identification information matches the identification of own apparatus.

In the information processing method of one embodiment of the present invention, in the effectiveness verification process of the seamless information, the seamless information recording control step may include performing an error detection operation in accordance with an error detection code set in a storage file of the seamless information and determining that the seamless information is effective if the file has been verified to be error free or alteration free.

In accordance with a third aspect of the present invention, a computer program for causing an information processing apparatus to record a content onto an information recording medium, includes an encoding step of performing with an encoder an encoding operation on the record content, a data processing step of performing, with a data processor, a conversion operation for converting data encoded in the encoding step on the encoder into data having a predetermined record format, a record processing step of recording onto the information recording medium, with a record processor, the data having the predetermined record format converted in the data processing step, and in the recording of the record content having the predetermined record format to the information recording medium, a seamless information recording control step of the data processor of acquiring predetermined seamless information applicable to a recording operation of a subsequent record content, and recording the seamless information in a record file defined by the record format.

The computer program of the present invention may be supplied in a computer-readable form in a recording medium or a communication medium to a computer system that can execute a variety of program codes. The recording media include a CD, FD, or MO, and the communication media include a network. By supplying the program in a computer readable form, the compute system can performs processes responsive to the program.

These and other objects, features and advantages of the present invention will become apparent from the description of the embodiments of the present invention and the accompanying drawings. In the specification, the word system refers to a logical set of a plurality of apparatuses and is not necessarily limited to elements housed in a single casing.

Advantages

In accordance with the present invention, an information processing apparatus such as a video camera records data in a manner that permits contents having discontinued recording timings to be played in a seamless fashion. To this end, the information processing apparatus acquires seamless information of a preceding record content to be applied to a recording process of a subsequent record content, and records the seamless information in a record file defined by a record format. For example, the seamless information is recorded in a clip information file. The seamless information remains recorded on an information recording medium as long as the content recorded on the information recording medium remains undeleted. The information processing apparatus can thus read and use the seamless information at any time. With this arrangement, the seamless information is reliably acquired and contents are always recorded in a manner that permits seamless playing.

BRIEF DESCRIPTION OF THE DRAWINGS

FIG. 8 illustrates syntax as a structure of a clip information file.

FIG. 9 illustrates syntax of an extension data block [ExtensionData ( )] of a clip information file.

FIG. 10 illustrates syntax of a clip information extension block [ClipInfoExt ( )].

FIG. 11 illustrates syntax of a maker private data block [MakersPrivateData ( )] in the extension data block of the clip information file.

FIG. 12 illustrates syntax of an extension data block [ExtensionData ( )} contained in an index file.

FIG. 13 illustrates syntax of a maker private data block [MakersPrivateDate ( )] in the extension data block of the index file.

FIG. 14 illustrates syntax of an extension data block [ExtensionData ( )] contained in a play list file.

FIG. 15 illustrates syntax of a maker private data block [MakersPrivateData ( )] in the extension data block of the play list file.

FIG. 16 illustrates syntax of a play list mark extension block [PlayListMarkExt ( )] in the extension data block in the play list file.

FIG. 17 is a flowchart illustrating a data recording process sequence performed by the information processing apparatus.

BEST MODE FOR CARRYING OUT THE INVENTION

An information processing apparatus, an information processing method and a computer program of the present invention are described below with reference to the drawings. The invention is described by element by element in the following order:

1. System structure
2. Data format
3. Record structure of seamless information
4. Data recording process sequence
5. Structure of the information processing apparatus

[1. System Structure]

Figure 1:
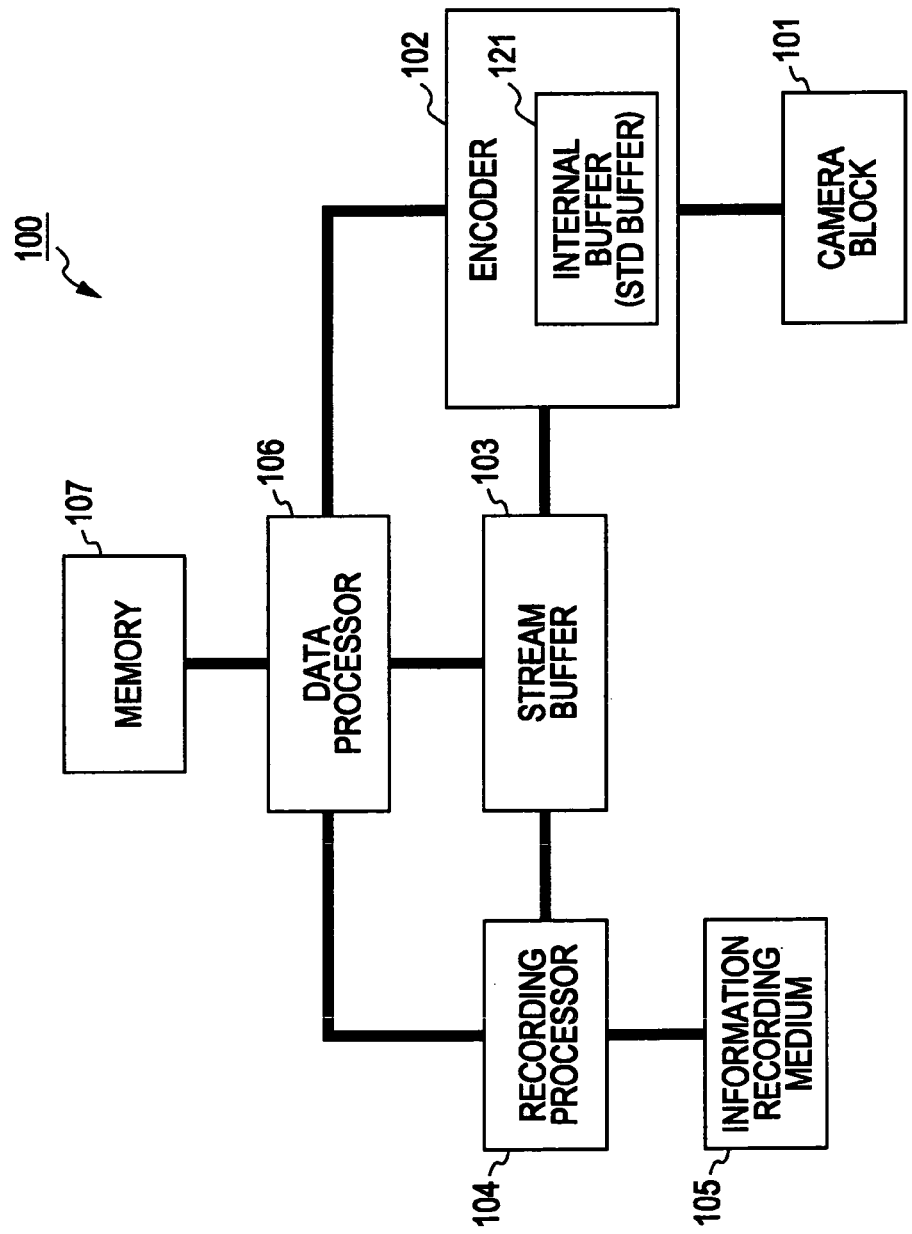
FIG. 1 is a block diagram illustrating a structure of an information processing apparatus of the present invention.

FIG. 1 diagrammatically illustrates a functional structure of an information processing apparatus 100 in accordance with one embodiment of the present invention. FIG. 1 illustrates a video camera as one example of the information processing apparatus 100. As shown in FIG. 1, the information processing apparatus 100 includes a camera block 101, an encoder 102, a stream buffer 103, a recording processor 104, an information recording medium 105, a data processor 106 and a memory 107. The encoder 102 includes internal buffer (STD buffer) 121.

The camera block 101 performs a photoelectric conversion process for converting a light signal input via a lens into an electrical signal and an A/D conversion process, thereby converting photograph data into digital data. The camera block 101 inputs the digital data to the encoder 102. The encoder 102 performs an encode process in accordance with MPEG-4 Part 10 Advanced Video Coding (AVC). During the encoding process, the internal buffer (STD buffer) 121 is used as a temporary accumulator of data.

Moving image data encoded by the encoder 102 is temporarily stored on the stream buffer 103. The data from the stream buffer 103 is formatted by the data processor 106. The recording processor 104 records the formatted data onto the information recording medium 105. The data processor 106 is a controller having a CPU. The data processor 106 functions as a recording controller generally controlling processes performed by the encoder 102, the recording processor 104, etc. The data processor 106 converts the encoded data into data in MPEG2-TS (Transport Stream) in order to perform a data recording process in AVCHD format on the information recording medium 105. The memory 107 stores a program necessary for the data processor 106 to operate. The memory 107 is thus a memory temporarily storing information for control. For example, the memory 107 may include a volatile memory such as SD-RAM (Random Access Memory) or a non-volatile memory such as a flash memory.

FIG. 1 illustrates a structure of the video camera as one example of the information processing apparatus of the present invention. The information processing apparatus of the present invention is not necessarily a video camera. The information processing apparatus may be an apparatus that records data onto an information recording medium. For example, the information processing apparatus may perform a recording process on a medium (information recording medium) by receiving a moving image stream from a transmission medium such as a LAN. The information recording medium 105 may be one of a variety of recording media including Blu-ray Disc (BD), DVD, HDD, and a semiconductor memory. The type of medium is not important as long as the information recording medium 105 can record data in accordance with a predetermined format such as AVCHD and has a sufficient recording capacity.

The stream buffer 103 is partitioned into two areas, one area storing elementary streams of video and audio (hereinafter referred to as video ES or audio ES) produced by the encoder 102 and the other area storing a transport stream (hereinafter referred to as TS) MPEG2-TS formatted to be data recorded in the AVCHD format. The transport stream (TS) includes a plurality of transport (TS) packets, each having a fixed length packet of 188 bytes. The TS packet includes a packet header having a 4 byte fixed length, an adaptation field and a payload.

When the encoded data is converted to MPEG2-TS format data, the data processor 106 adds PTS, DTS and SCR of the video and audio as time information used in a playing process.

PTS (Presentation Time Stamp) and DTS (Decoding Time Stamp) are time stamps as time information for play timing and decode process timing, and are set as attribute information for stream data. SCR (System Clock Reference) serves as reference time information.

In the course of converting the encoded data into MPEG2-TS format data in a standard data recording process, the data processor 106 successively increases these values of the time information from appropriate initial values thereof set for respective apparatuses while attaching the values to the TS. For example, in a standard photographing process of the video camera, the encoder 102 updates, in response to encode results, buffer amounts of buffer models from the initial values of a video buffer amount and an audio buffer amount of a STD (System Target Decoder) model set for each apparatus. The encoder 102 thus controls a buffer accumulated amount so that the buffer model is not destroyed. To record the moving image to be seamless played, the seamless information is stored. The seamless information contains PTS, DTS and SCR of a last moving image previously photographed and accumulated information of internal buffer (STD buffer) 121 in the encoder. When a next data recording process (photographing process) is performed, the seamless information is acquired. The encode process is then performed so that a buffer model such as a STD buffer model is not destroyed. The stream data permitting seamless playing is thus recorded. Separate internal buffers (STD buffers) 121 may be set for respectively video and audio.

At the end of the recording of one stream, the encoder 102 calculates, for each of video and audio, last buffer amounts of the internal buffer (STD buffer) 121 and notifies the data processor 106 of last buffer amounts of the video and audio. The data processor 106 causes the memory 107 to store the last accumulation amount of the internal buffer (STD buffer) 121 supplied from the encoder 102 and the time information composed of last video PTS, DTS, audio PTS, and SCR produced at the conversion to the MPEG2-TS format.

At the start of a next photograph operation, the data processor 106 acquires the seamless information from the memory 107 and notifies the encoder 102 of the seamless information. The encoder 102 can thus perform the encode process with last buffer amount of the internal buffer (STD buffer) 121 set as an initial value. The data processor 106 can thus perform the MPEG2-TS format conversion process with the PTS, DTS and SCR of each of the video and audio contained in the seamless information set as the initial values. Data enabling seamless playing is thus recorded.

As described above, with the seamless information stored on the memory 107, the seamless information corresponding to the recorded stream can be deleted when the last recorded stream is deleted, or when the information recording medium having recorded the stream is removed (ejected) and then reloaded, or when power is switched off. When a next stream is recorded, the seamless information cannot be reliably acquired. If effective seamless information corresponding to last recorded stream is missing, content recording enabling seamless playing cannot be performed.

In accordance with the information processing apparatus of the present invention, the seamless information is recorded in a data file defined by a record format of content when data recording is performed on the information processing apparatus such as a video camera. More specifically, to permit contents having discontinued recording timings to be played in a seamless fashion, seamless information of a preceding record content to be applied to a recording process of a subsequent record content is acquired. The seamless information is then recorded in a record file defined by a record format. For example, the seamless information is recorded in a clip information file. The seamless information remains recorded on an information recording medium as long as the content recorded on the information recording medium remains undeleted. The information processing apparatus can thus read and use the seamless information at any time. With this arrangement, the seamless information is reliably acquired and contents are always recorded in a manner that permits seamless playing.

[2. Data Format]

Figure 2:
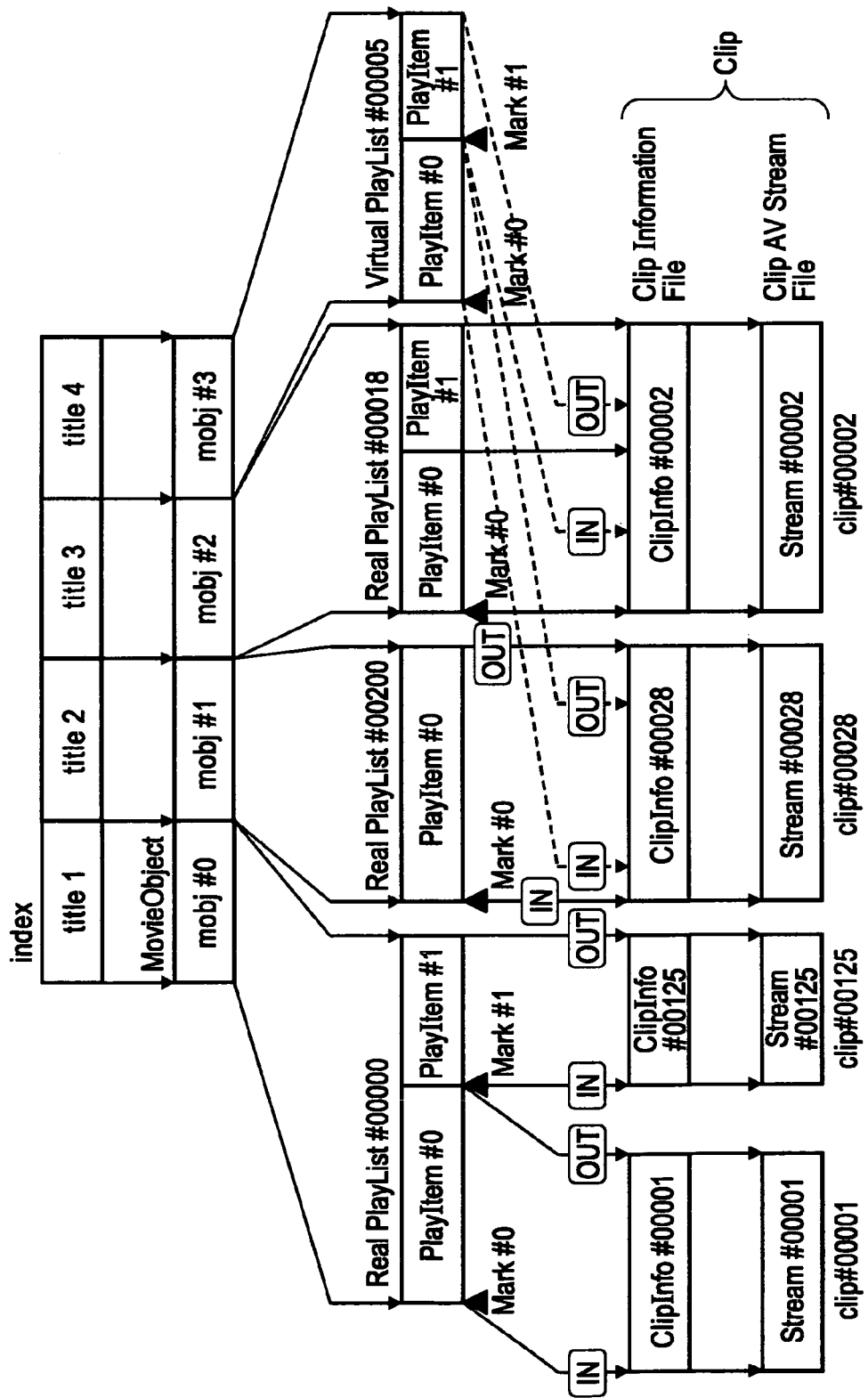
FIG. 2 illustrates a data structure of record data in the information processing apparatus.

FIG. 2 illustrates an example of a data structure to record data on the information recording medium 105. In the following discussion, data recording in accordance with the AVCHD format is described. As shown, when the moving image stream captured by the video camera is encoded into an MPEG2-TS format stream, an index file, a movie object (MovieObject) file, a play list (PlayList) file, a clip information (ClipInformation) file, and a clip AV stream (ClipAVStream) file are recorded. A clip AV stream file having a predetermined data unit and a clip information file corresponding thereto are collectively referred to as a clip. Each of the files is described in detail below.

TABLE 1

| File type | Maximum number | Function |
|---|---|---|
| Index | 1 | Base file managing the entire medium, namely, managing correspondence between title to be displayed to user and MovieObject. In HD-AVC format, play order of playlist to be managed in MovieObject file is managed within metadata of index file. |
| MovieObject | 1 | In BD-ROM format, MovieObject file manages playlist played when title is specified. In HD-AVC format, however, MovieObject is not referenced, and relation between playlist and title is managed by metadata in index file. |
| Real PlayList | 2000 in total | Playlist of original title. Registered in the order of recording of recorded video or played video. |

TABLE 1-continued

| File type | Maximum number | Function |
|---|---|---|
| Virtual Playlist | | Playlist for producing user-defined playlist in non-destructive editing. Having no clip for the virtual playlist itself but specifying clip registered in real playlist for playing. |
| Clip Information | 4000 | Paired with Clip AV Stream and containing information related to stream required to play actual stream. |
| Clip AV Stream | 4000 | Stored in stream recorded in MPEG2-TS. AVC image data stored in this file. |

The whole information recording medium 105 is managed in a file type layer of index. An index file is produced for each title to be displayed to a user. The index file manages a correspondence relationship with a MovieObject file. In the AVCHD format, the play order to be managed by the MovieObject file is actually managed in metadata. When an information recording medium is loaded on a player, the index file is first read and the user can see the title described in the index file.

The MovieObject file manages a playlist to be played. A reference to the MovieObject file is listed in the index file as an entrance to the title. In the AVCHD format, however, the relationship between the PlayList and the title is managed by the metadata in the index file without referencing the MovieObject file.

The PlayList is arranged for each title to be displayed to the user, and contains at least one PlayItem. Each PlayItem contains a play start point (IN point) and a play end point (OUT point) for each clip, thereby specifying a play period. By arranging a plurality of PlayItems within the PlayList along time axis, the play order in the play period may be specified. PlayItems referencing different clips may be contained in a single PlayList.

The reference relationship between the clip and the PlayList may be optionally set. For example, a single clip may be referenced by two PlayLists different in IN point and OUT point. The reference relationship between the title and MovieObject may be optionally set. PlayLists are divided into RealPlayLists and VirtualPlayLists depending on the reference relationship thereof with clips.

The RealPlayList is a PlayList for an original title and is recorded in the record order of PlayItems of a video stream recorded or photographed by the video camera.

The VirtualPlayList is used to produce a user-defined PlayList through non-destructive editing. The VirtualPlayList has no clip (AV stream) thereof, and a PlayItem therewithin indicates a clip or a portion of the clip registered in a RealPlayList. More specifically, the user extracts a needed play period from a plurality of clips and collects PlayItems pointing to the play period, thereby editing the VirtualPlayList.

The ClipAVStream file contains a stream recorded in the MPEG-TS format on the information recording medium 105. Image data is stored in this file.

The ClipInformation file, paired with the ClipAVStream file, contains information relating to a stream required to play an actual stream.

As described above, the index file, the movie object (MovieObject) file, the play list (PlayList) file, the clip information (ClipInformation) file and the AV stream (ClipAVStream) file are generated in accordance with the AVCHD format.

The names of these files and data are examples only, and different names can be used. The content of each file and data are listed as below.

(1) AV stream (ClipAVStream): Content data (2) Clip information (ClipInfomration): The clip information has one-to-one correspondence with the AV stream and the ClipInformation file defines attribute of the corresponding AV stream. (For example, coding, size, time to address conversion, play management information, time map, etc. are contained in this file.)

(3) Play item (PlayItem): Data specifying a play period by a play start point and a play end point to the clip information (ClipInformation).

(4) Play list (PlayList): Each play list is composed at least one play item (PlayItem).

(5) Mark: Mark is typically present in the play list (PlayList) and indicates time position in the play content. Generally, a duration from one mark to a next mark is referred to as a chapter.

(6) Movie object (MovieObject): Set of commands for controlling playing.

(7) Title: Set of play lists (recognizable by the user).

Data and files having the above contents are described as the AV stream (ClipAVStream), the clip information (ClipInformation), the play item (PlayItem), the play list (PlayList), the mark, the movie object (MovieObject), and the title. The present invention is also applicable to data and files having contents substantially identical to those described above.

Figure 3:
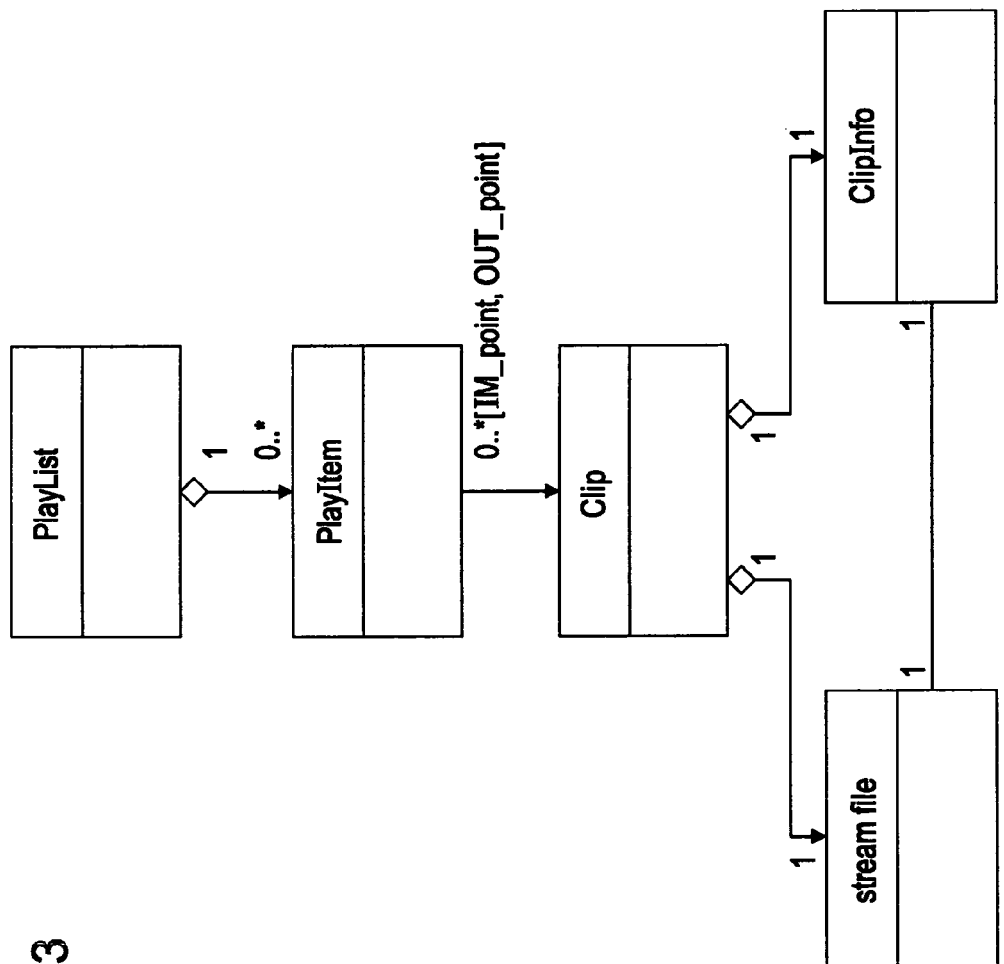
FIG. 3 illustrates UML (Unified Modeling Language) indicating relationship of a play list (PlayList), a play item (PlayItem), a clip, clip information (ClipInformation) and a clip AV stream (ClipAVStream).

FIG. 3 illustrates UML (Unified Modeling Language) indicating the relationship of the play list (PlayList), the play item (PlayItem), the clip, the clip information (ClipInformation), the clip AV stream (ClipAVStream) described with reference to FIG. 2. The play list is mapped to one or a plurality of play items, and each play item is mapped to one clip. One clip can map to a plurality of play items different in start point and/or end point. One clip AV stream file can be referenced from one clip. Similarly, one clip information file can be referenced from one clip. The clip AV stream file and the clip information file have one-to-one correspondence to each other. By defining this structure, play order is specified in a non-destructive fashion with any portion extracted without modifying the clip AV stream file.

Figure 4:
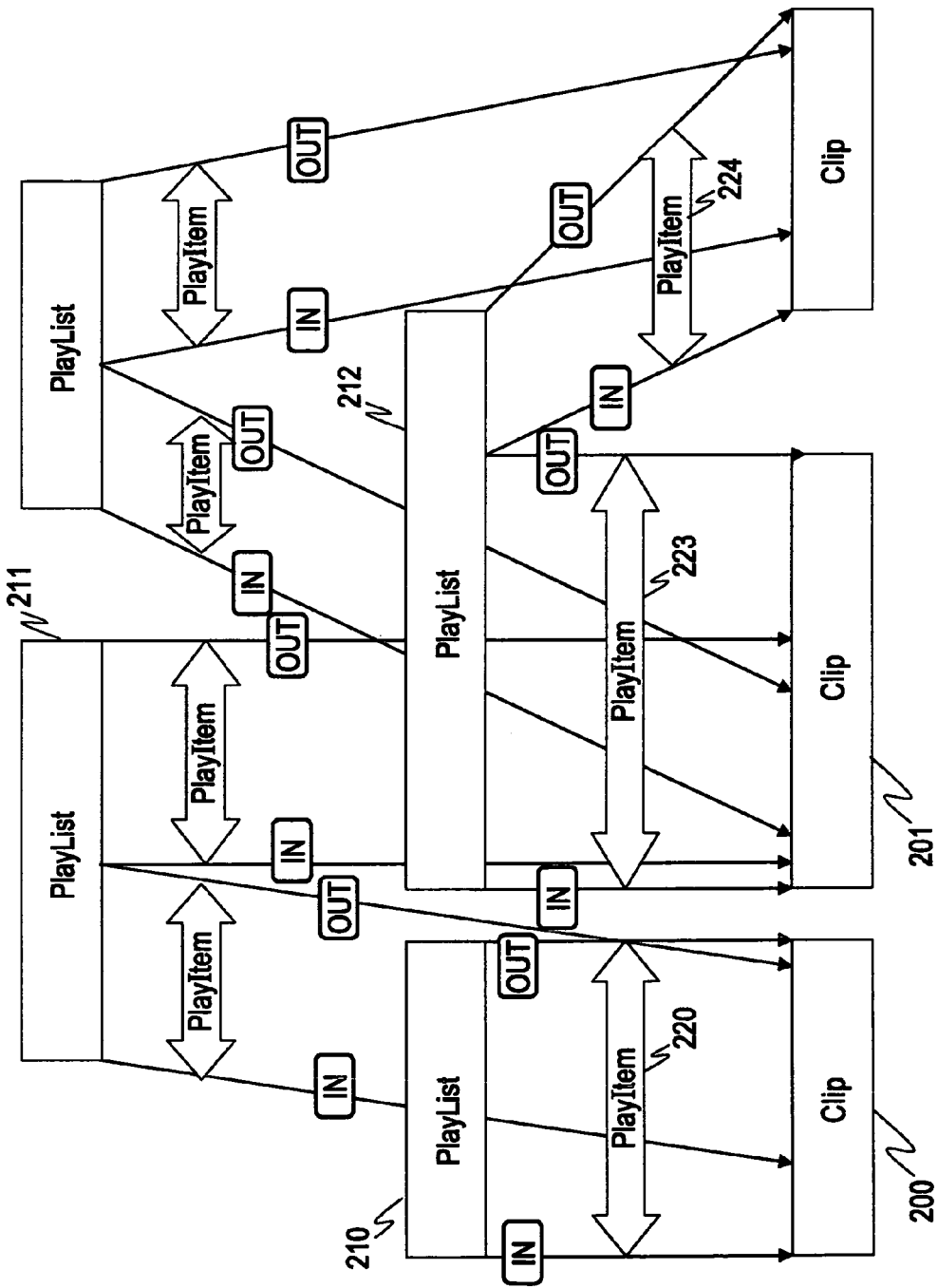
FIG. 4 illustrates reference relationship between the play list and the clip.

With reference to FIG. 4, the same clip may be referenced from a plurality of play lists. Alternatively, a plurality of clips may be referenced from a single play list. The clip may be referenced by the IN point and the OUT point indicated in the play item in the play list. As shown in FIG. 4, a clip 200 can be referenced from a play item 220 in a play list 210 while also being referenced from a play item 221 out of play items 221 and 222 in a play item 211 in accordance with a play period defined by an IN point and an OUT point. A clip 201 is referenced by a play item 222 in the play list 211 in accordance with a play period defined by an IN point and an OUT point. The clip 201 is also referenced in accordance with a period defined by an IN point and an OUT point of the play item 223 out of play items 223 and 224 in a play list 212.

Figure 5:
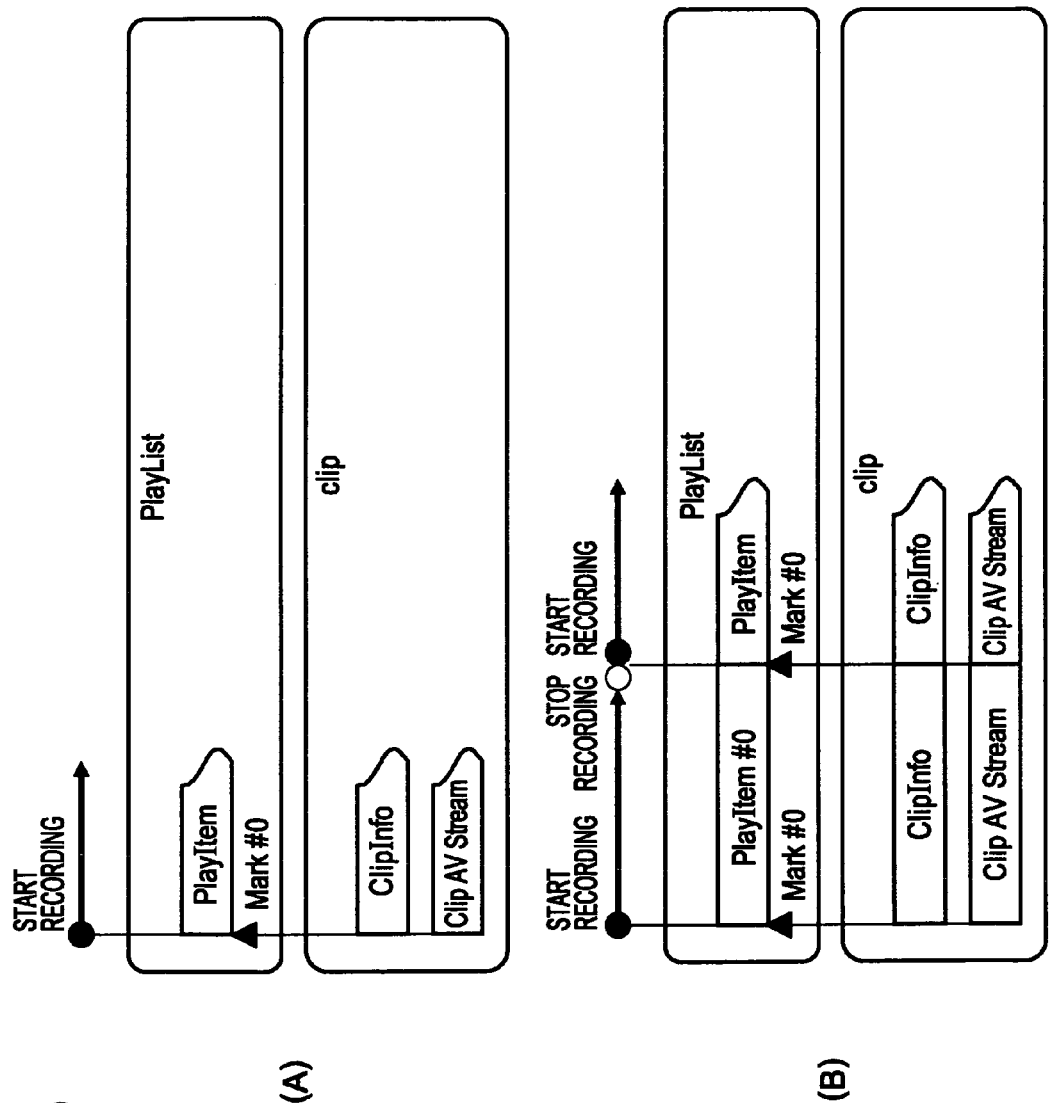
FIG. 5 illustrates a procedure according to which a clip of AV stream and a play list are produced when picture is recorded or picked up by a video camera.
Figure 6:
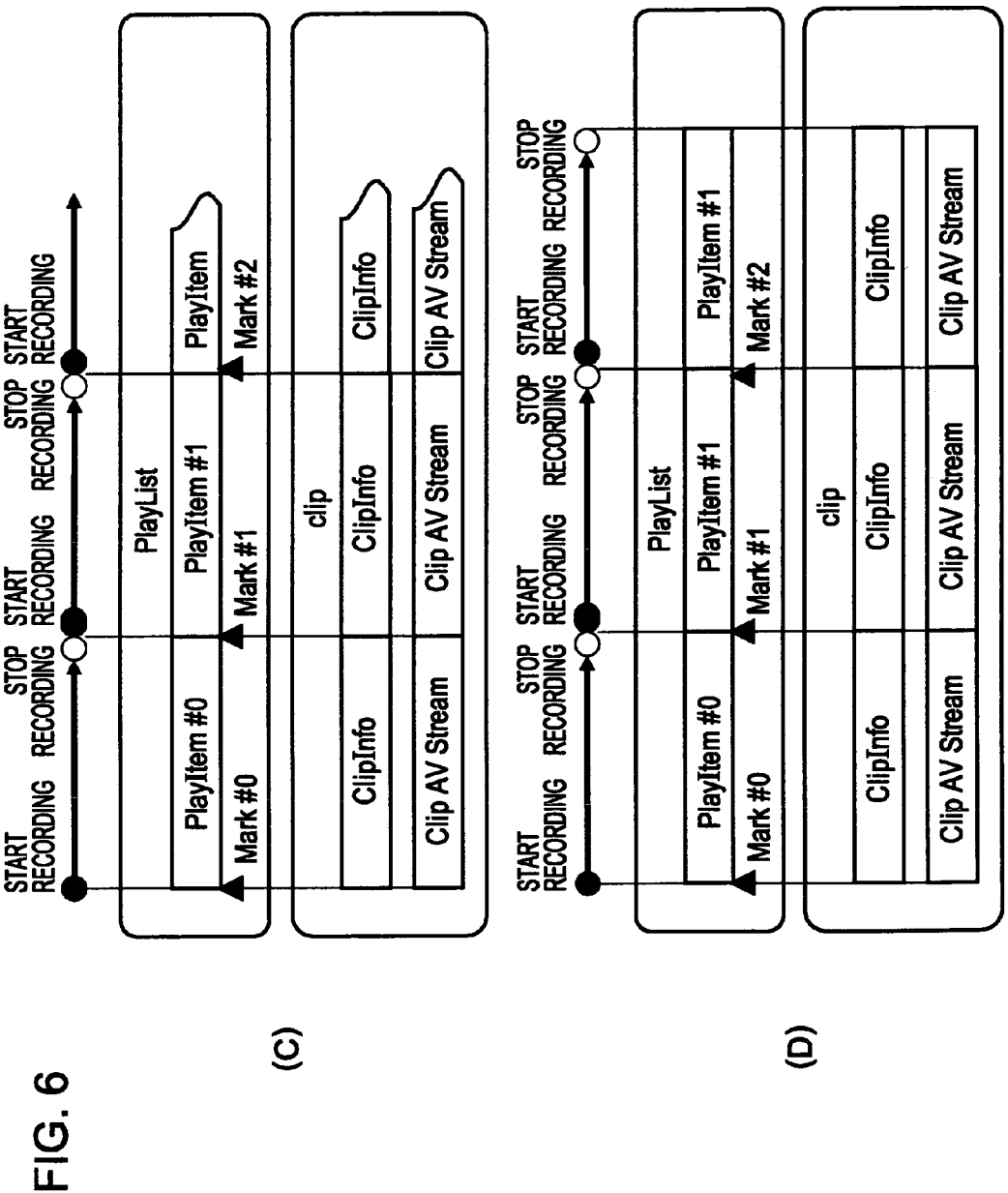
FIG. 6 illustrates a procedure according to which a clip of AV stream and a play list are produced when picture is recorded or picked up by a video camera.

A procedure of generating a play list together with a clip of an AV stream in response to recording and photographing operations of the video camera is described with reference to FIGS. 5 and 6.

FIGS. 5(a) and 5(b) and FIGS. 6(c) and 6(d) illustrate a generation process of the clip and the play list when the user repeats start and stop of a recording process in the order (a) through (d). As shown in FIGS. 5 and 6, one play item is successively generated in each period lasting from when the user starts recording to when the user stops recording. One clip AV stream file is generated in one period of the stream recorded or photographed. Along with the clip AV stream file, the clip information file is also generated. One clip is one unit that guarantees continuous synchronization playing, namely, real-time playing.

Each time the user starts recording, a mark as an entry mark is attached to the front of the play item (the entry mark within the play list is referred to as "play list mark (PLM)." Each play item and mark are tagged with consecutive sequence numbers in one play list. It is required that the entry mark is attached to the front of the play list of a moving image, but a predetermined editing operation can shift the position of the entry mark along time axis.

The entry mark is an entry position through which the user can access the stream. Periods delimited by the consecutive entry marks (and a period from a last mark to the end of last play item) are minimum editing units recognized by the user, namely, "chapters." The play order of the play lists is defined by arranging play items and entry marks in the play order.

When the play list is played, continuous playing may be performed across two AV streams. In this case, the internal buffer of the encoder can be overflown. A next stream is played after the playing of a first stream has been completed. For this reason, screen is frozen at the switch of stream.

By performing the process with the seamless information applied as discussed previously, "seamless playing" for continuous playing straddling consecutive streams is performed. To produce the seamless playing streams, the seamless information containing the buffer status and the time information is stored at the end of the recording of a preceding AV stream and set to be ready for use. The seamless information is described in detail below.

TABLE 2

| Information | Content |
| --- | --- |
| VIDEO INPUT BUFFER VALUE | Accumulated amount at STD Video Buffer at preceding recording [Bytes] |
| AUDIO INPUT BUFFER VALUE | Accumulated amount at STD Audio Buffer at preceding recording [Bytes] |
| VIDEO END PTS | PTS of Video at preceding recording [90 kHz] |
| AUDIO END PTS | PTS of Audi at preceding recording [90 kHz] |
| VIDEO END DTS | PTS of Video at preceding recording [90 kHz] |
| END SCR BASE | SCR value at preceding recording [90 kHz] |
| END SCR EXT | Fraction of SCR value at preceding recording [27 kHz] |

VIDEO INPUT BUFFER VALUE and AUDIO INPUT BUFFER VALUE are buffer accumulated amounts of video and audio at the end of the recording operation of the internal buffer (STD buffer) 121 in the encoder 102 of FIG. 1, respectively.
VIDEO END PTS and AUDIO END PTS are last set information of the present time stamp PTS at the end of the recording operation, in other words, are attribute information of the video and audio data set as time information of play timings.
VIDEO END DTS is decoding time stamp (DTS) set at the end of the recording operation, in other words, is attribute information for data set as time information of decoding process timing.
END SCR BASE and END SCR EXIT is system clock reference (SCR) as time reference information at the end of the recording operation.

If the title of the content, namely, one play list is composed of a plurality play items, connection condition (CC) to an immediately preceding play item indicating whether continuous playing is possible or not is described in the play item. If connection to subsequent clip information is described as Connection Condition=5, the clip information has a description of connection condition, namely, the file name of the subsequent ClipInformation and Connection Condition=5.

[3. Record Structure of Seamless Information]

A record structure of the seamless information in the information processing apparatus of the present invention is described below. As previously discussed, the seamless information is recorded in a data file defined by the record format of the content when data recording is performed on the information processing apparatus of the present invention, such as the video camera. More specifically, to permit contents having discontinued recording timings to be played in a seamless fashion, the seamless information of a preceding record content to be applied to a recording process of a subsequent record content is acquired. The seamless information is then recorded in the record file defined by the record format. For example, the seamless information is recorded in a clip information file.

The seamless information remains recorded on an information recording medium as long as the content recorded on the information recording medium remains undeleted. The information processing apparatus can thus read and use the seamless information at any time. With this arrangement, the seamless information is reliably acquired and contents are always recorded in a manner that permits seamless playing.

Figure 7:
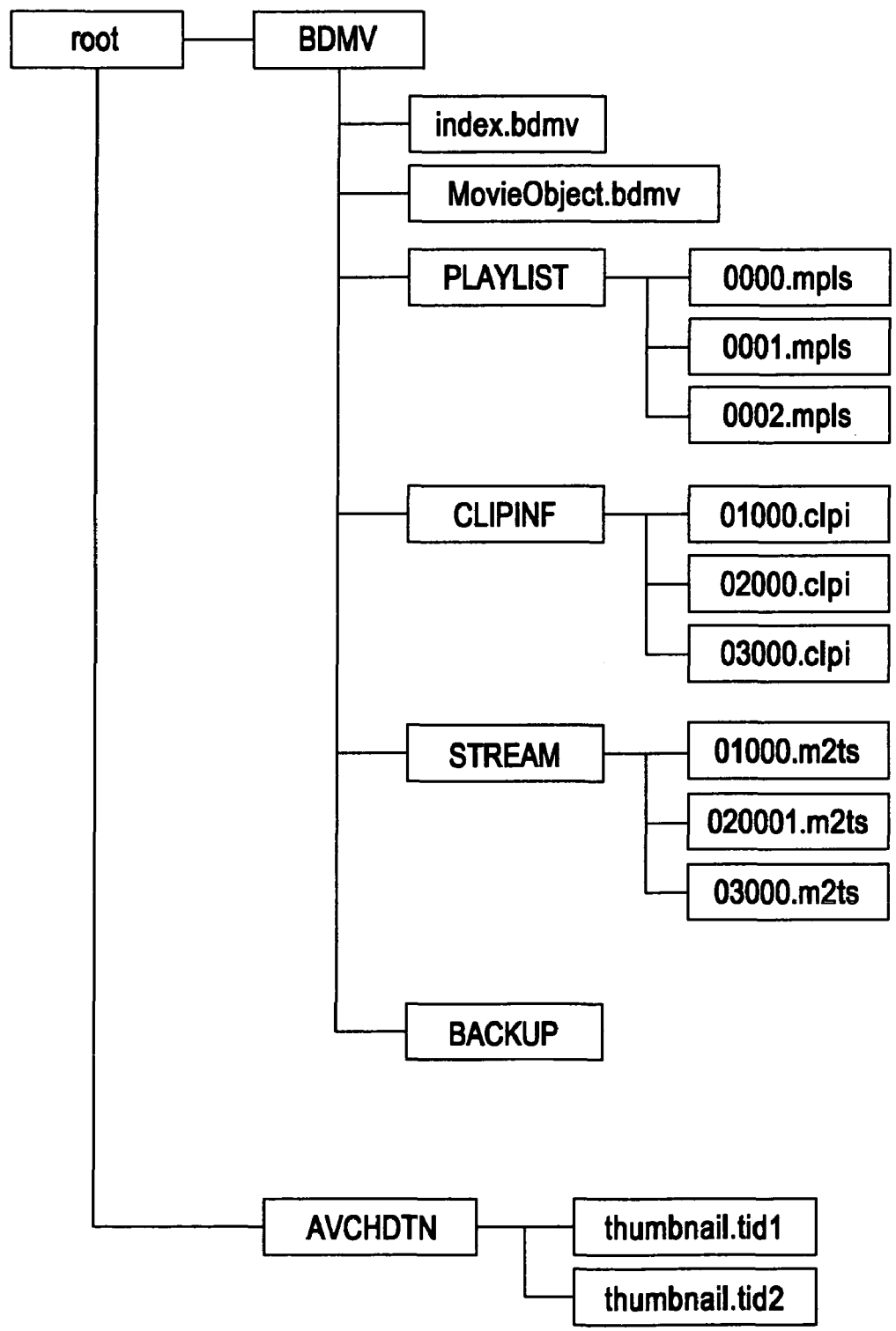
FIG. 7 illustrates a management structure of a file recorded on an information recording medium.

A file management structure for recording files onto the information recording medium is described below. As previously discussed with reference to FIGS. 2 through 4, data to be recorded on the information recording medium contains a movie object (MovieObject) file, a play list (PlayList) file, and a clip file. The clip files contain clip information (ClipInformation) file and a clip AV stream (ClipAVStream) file. The management structure of the file to be recorded on the information recording medium is described below with reference to FIG. 7. The files are managed in a layer structure with directories. One directory (root directory as shown in FIG. 7) is produced on the information recording medium. A range under this directory is managed by a single recording and reproducing system.

A directory [BDMV] and a directory [AVCHDTN] are arranged under the root directory. Thumbnail files having a representative image of a clip reduced to a thumbnail size are arranged under the directory [AVCHDTN]. The data structured discussed with reference to FIG. 2 is stored under the directory [BDMV].

Only two files, namely, an index file [indx.bdmv] and a movie object file [MovieObject.bdmv] are permitted to be directly placed under the directory [BDMV]. Directories placed under the BDMV directory [BDMV] are a play list directory [PLAYLIST], a clip information directory [CLIPINF], a stream directory [STREAM] and a directory [BACKUP].

The index file [index.bdmv] describes the content of the directory BDMV. The movie object file [Movieobject.bdmv] contains information of at least one movie object.

The play list directory [PLAYLIST] is a directory of database of the play list. More specifically, the play list directory [PLAYLIST] contains a play list file [xxxxx.mpls] as a file relating to the movie play list. The play list file [xxxxx.mpls] is produced for each movie play list. The "xxxxx" ahead of the period "." in the file name is a five-digital number, and the "mpls" in succession to the period is an extension fixed to this type of file.

The clip information directory [CLIPINF] contains a database of each clip. More specifically, the clip information directory [CLIPINF] contains a clip information file [zzzzz.clpi] for each clip AV stream file. The "zzzzz" ahead of the period "." is a five-digital number and the "clpi" in succession to the period is an extension fixed to this type of file.

The stream directory [STREAM] contains an AV stream file as a body. More specifically, the stream directory [STREAM] contains a clip AV stream file respectively corresponding to each clip information file. The clip AV stream file contains a MPEG2 (Moving Pictures Experts Group 2) transport stream (hereinafter referred to as MPEG2 TS), and the file name thereof is "zzzzz.m2ts." In the file name, the "zzzzz" ahead of the period is the same as the corresponding clip information file so that the clip information file and the clip AV stream file are easily recognized as having correspondence therebetween.

The directory [AVCHDTN] can contain two types of thumbnail files thumbnail.tidx and thumbnail.tdt2. The thumbnail file thumbnail.tidx contains a thumbnail image encrypted through a predetermined method. The thumbnail file thumbnail.tdt2 contains an unencrypted thumbnail image. A thumbnail image corresponding to a clip the user has photographed with a video camera can be freely copied and does not need encryption. Such a thumbnail image can be stored in the thumbnail file thumbnail.tdt2.

The information processing apparatus of the present invention records in the files set in the directory structure of FIG. 7 the seamless information required for seamless playing. The seamless information contains the buffer accumulated amount information of the video and audio at the end of the recording operation of the internal buffer (STD buffer) 121 in the encoder 102 of FIG. 1, and time stamps at the time information at play timing and decode process timing such as PTS (Presentation Time Stamp), the decoding time stamp (DTS), and the system clock reference (SCR) as the reference time information.

The recording destination of the seamless information may be one of files including the clip information file, the play list file, the index file, and the movie object file.

The information processing apparatus of the present invention converts the AV stream data into the record format data. The record format data contains the AV stream file as the AV stream data having a predetermined unit, the attribute file (clip information file) mapping the play time information of the AV stream file to the address information, and the play list file (PlayList) composed of at least one piece of play period data (PlayItem) specifying the play period of the AV stream data by the play start point and the play end point. The information processing apparatus then stores the AV stream data onto the information recording medium. The information processing apparatus then records the seamless information in at least one of the attribute file (clip information file), the play list file (PlayList), the index file, and the file composed of the set of commands for controlling playing (MovieObject).

The record structure of the seamless information is specifically described with reference to syntax of each file. The record structure of the seamless information is successively described file by file as below:

(a) Record structure of the seamless information for the clip information file, (b) Record structure of the seamless information for the index file, and (c) Record structure of the seamless information for the play list file.

(a) Record structure of the seamless information for the clip information file.

Record structure of the seamless information for the clip information file is discussed first. FIG. 8 illustrates syntax of the structure of one example of the clip information file. The syntax here is described based on the C language used to describe programs of computers. The same is true of the other syntax charts.

In the clip information file of FIG. 8, a field [type_indicator] having a data length of 32 bits indicates that this file is a clip information file. A field [version_number] having a data length of 32 bits indicates a version number of this file. Each of fields [SequenceInfi_start_address] to [ExtensionData_Start_address], having a data length of 32 bits indicates a start address of each data block in this syntax. The start address is represented by the relative number of bytes from the front byte defined in the file.

Clip information blocks [ClipInfo( )] to clip mark block [ClipMark( )] contain the actual body of the content of the clip information file. More specifically, these blocks contain information relating to the stream required to play the actual stream.

A extension data block [ExtensionData( )] is defined when BD-ROM standard is extended to be applied to a recording medium.

With reference to FIG. 9, the extension data block [ExtensionData( )] of the clip information file is described below. The field [type_indicator] in the extension data block of FIG. 9, having a data length of 32 bits, indicates the extension data block. Fields [ProgramInfoExt_start_address] and [Makers PrivateData_Start_address], having a data length of 32 bits, respectively indicate start addresses of a data block of a program information extension block [ProgramInfoExt] and maker private data [MakersPrivateData]. The start address is represented by the relative number of bytes from the front byte defined in the extension data block [ExtensionData( )]. The information processing apparatus can acquire necessary data based on the address data.

A clip information extension block [ClipInfoExt( )], a program information extension block [ProgramInfoExt( )] and a maker private data block [MakersPrivateData( )] contain actual contents to be recorded in the extension data block [ExtensionData( )].

FIG. 10 illustrates syntax of the clip information extension block [ClipInfoExt( )]. A maker ID and a maker model code are recorded in the information extension block [ClipInfoExt( )] of the extension data block of the clip information file of FIG. 10. The information extension block [ClipInfoExt( )] is set up as an area for storing the model ID (identifier) and the maker model code of the information processing apparatus having performed an information recording process. The information processing apparatus performing the information recording process records the model ID (identifier) and the maker model code of the information processing apparatus in this field in accordance with a content recording program. The model ID and the maker model code may be referenced in the information processing apparatus to enable seamless playing. Such a process will be described later.

FIG. 11 illustrates syntax of the maker private data block [MakersPrivateData( )] of the extension data block of the clip information file. A data block start address [data_block_start_address] indicates a start address of the data block. The number of maker entries [number_of_maker_entries] records a plurality of sets of maker IDs and maker model codes as device information of the information processing apparatus performing information recording.

A data block [data_block] 301 of FIG. 11 is a data recording area in the maker private data block [MakersPrivateData( )]. The previously described seamless information is recorded in the data block 301. The seamless information is information required to record data for seamless playing, and contains internal buffer information of the encoder 102, the time stamp information (PTS and DTS) and the reference time information (SCR).

The clip information file is set for each clip. The seamless information containing the internal buffer information of the encoder 102, the time stamp information (PTS and DTS), the reference time information (SCR), etc. is recorded at the end of the clip recording. When data recording is resumed after an interruption of the data recording process, subsequent record data is recorded as seamless playable data in succession to last record data. More specifically, the data processor 106 of FIG. 1 acquires the seamless information from the clip information file and notifies the encoder 102 of the seamless information. The encoder 102 performs the encode process based on the seamless information, for example, the encode process with a last buffer amount of the internal buffer (STD buffer) 121 set. The data processor 106 enables the data to be seamless played by performing a conversion process to the MPEG2-TS format with the PTS, DTS and SCR of the video and audio contained in the seamless information used as initial values. A more specific data recording process sequence will described with reference to flowcharts later.

(b) Record Structure of the Seamless Information for the Index File

The record structure of the seamless information for the index file is described below. FIG. 12 illustrates syntax of the extension data block [ExtensionData( )] contained in the index file. The extension data block [ExtensionData( )] in the index file contains a field [type_indicator] indicating the type of data, data start address [TableOfPlayLists_start_address] and [MakersPrivateData_start_address] of data to be recorded in the extension data block [ExtensionData( )], and, further, as actual data recording areas, a block [UIAppInfoAVCHD( )], a block [TableOfPlayLists( )] and a block [MakersPrivateData( )].

FIG. 13 illustrates syntax of the maker private data block [MakersPrivateData( )] in the extension data block of the index file. As shown in FIG. 13, the maker private data block [MakersPrivateData( )] contained in the index file has the same structure as the maker private data block in the clip information file previously discussed with reference to FIG. 11. The maker private data block [MakersPrivateData( )] in the index file contains a data block start address [data_block_start_address] indicating a start address of the data block, the number of maker entries field [number_of_maker_entries] and a data block [data_block] 311 as an actual data recording area.

As shown in FIG. 13, the model ID (identifier) and the maker model code are recorded in the maker private data block [MakersPrivateData( )] contained in the index file. These pieces of information are identification information of the information processing apparatus having performed the information recording process. The model ID and the maker model code may be referenced to enable seamless playing in the information processing apparatus. Such a process may be described later.

The seamless information is recorded in the data block 311. More specifically, the seamless information required to record data that permits seamless playing contains the internal buffer information of the encoder 102, the time stamp information (PTS and DTS) applied to generate MPEG-TS data, and the reference time information (SCR), etc. At the end of the recording process, the information processing apparatus records the seamless information composed of the internal buffer information of the encoder 102, the time stamp information (PTS and DTS), the reference time information (SCR), etc. To resume data recording after an interruption of the data recording process, the seamless information is acquired so that the subsequent record data is recorded as seamless playable data in succession to last record data.

(c) Record Structure of the Seamless Information for the Play List File

The record structure of the seamless information for the play list file is described below. FIG. 14 illustrates syntax of the extension data block [ExtensionData( )] contained in the play list file. The extension data block [ExtensionData( )] in the play list file contains a field [type_indicator] indicating the type of data, start addresses [PlayListMarkExt_start_address] and [MakersPrivateData_start_address] of data recorded in the extension data block [ExtensionData( )] and further as actual data recording areas, a block [PlayList-Meta( )], a play list mark extension block [PlayListMark-Ext( )] 321 and a maker private data block [MakersPrivate-Data( )] 322.

FIG. 15 illustrates syntax of the maker private data block [MakersPrivateData( )] 322 in the extension data block of the play list file of FIG. 14. As shown in FIG. 15, the maker private data block [MakersPrivateData( )] in the play list file has the same structure as the maker private data block in the clip information file discussed with reference to FIG. 11 and the maker private data block in the index file discussed with reference to FIG. 13. More specifically, the maker private data block [MakersPrivateData( )] in the play list file contains a data block start address [data_block_start_address] indicating a start address of the data block, the number of maker entries field [number_of_maker_entries] and a data block [data_block] 331 as an actual data recording area.

The previously discussed seamless information is recorded in the data block 331. More specifically, the seamless information required to record data that permits seamless playing contains the internal buffer information of the encoder 102, the time stamp information (PTS and DTS) applied to generate MPEG-TS data, and the reference time information (SCR), etc. At the end of the recording process, the information processing apparatus records the seamless information composed of the internal buffer information of the encoder 102, the time stamp information (PTS and DTS), the reference time information (SCR), etc. To resume data recording after an interruption of the data recording process, the seamless information is acquired so that the subsequent record data is recorded as seamless playable data in succession to last record data.

FIG. 16 illustrates syntax of the play list mark extension block [PlayListMarkExt( )] 321 in the extension data block of the play list file of FIG. 14. As shown in FIG. 16, the play list mark extension block [PlayListMarkExt( )] contains a variety of information including a maker ID [maker ID] and a maker model code [maker model code] corresponding to the information processing apparatus having generated the play list, and recording time information [record_time_and_date]. These pieces of information are identification information of the information processing apparatus having performed the information recording process. The maker ID (identifier) and the maker model code contained in the play list file may be referenced in the information recording process to enable seamless playing. Such a process may be described later.

The illustrated syntaxes have been discussed with reference to the following record structures:
  (a) Record structure of the seamless information for the clip information file,
  (b) Record structure of the seamless information for the index file, and
  (c) Record structure of the seamless information for the play list file.

The record structures of the seamless information for those files have been discussed. In this case, the seamless information may be recorded in the movie object file. As in other files, the maker private data block [MakersPrivateData( )] is set in the movie object file and the seamless information is recorded in this block.

[4. Data Recording Process Sequence]

A data recording process sequence performed by the information processing apparatus of the present invention is described with reference to flowcharts of FIGS. 17 and 18. The flowchart of FIG. 17 is related to a process performed at the end of the data recording in the information processing apparatus, namely, a process for recording the seamless information in a file set in the directory structure of FIG. 7. As described above, the recording destinations of the seamless information include a variety of files such as:
  (a) clip information file,
  (b) index file, and
  (c) play list file,
and the process flow of FIG. 17 shows the process in which the seamless information is recorded in the clip information file.

In step S101, the data processor 106 in the information processing apparatus performing the information recording process converts MPEG-ES data processed by the encoder 102 and stored on the stream buffer 103 into MPEG2-TS data at the end of the recording process. As previously discussed, the data processor 106 sets the time stamps PTS and DTS as the time information at the play timing and the decode process timing and the SCR as the reference time information. The set information is stored temporarily on the memory 107.

In step S102, the recording processor 104 under the control of the data processor 106 records the converted MPEG2-TS data onto the information recording medium 105. In step S103, the data processor 106 acquires last buffer accumulated amount information of the internal buffer 121 from the encoder 102. Such information is temporarily recorded on the memory 107.

In step S104, the data processor 106 acquires from the memory 107 the time stamps PTS and DTS, the reference time information SCR, and last buffer accumulated amount information of the internal buffer 121 in the encoder 102. The data processor 106 then records these pieces of information, namely, the seamless information in the clip information file. The recording destination of the seamless information is the maker private data block [MakersPrivateData( )] in the extension data block of the clip information file discussed with reference to FIGS. 8 through 11. Subsequent to the recording process of the seamless information, files required to update other files are recorded in step S105. The data recording process thus ends.

The information processing apparatus of the present invention records the seamless information in the file set in the directory structure complying with the content record format. The seamless information recorded on the information recording medium remains present as long as the content recorded on the information recording medium remains undeleted. The seamless information may be read and used at any time. The seamless information is reliably acquired and the seamless-playable content can be always recorded.

In the flowchart of FIG. 17, the recording destination of the seamless information is the clip information file.

As previously discussed, a variety of recording destinations can be set including:
  (a) clip information file,
  (b) index file,
  (c) play list file, and
  (d) movie object file.

The process of starting the data recording process in the information processing apparatus is described with reference to FIG. 18. In this process, the seamless information recorded in a file such as the clip information file is acquired, and data is then recorded in a manner that allows the data to be seamless played. In the process of FIG. 18, the seamless information is recorded in the clip information file.

In step S201, the data processor 106 in the information processing apparatus determines whether additional writing is possible to a play list as a candidate in the information recording, namely, the same play list as the one having undergone last recording process. For example, if a maximum number of play items settable in the play list has been reached, it is determined in step S202 that additional writing to that play list becomes impossible. Additional writing to that play list is determined to be impossible in step S202 in such a case. Processing proceeds to step S211. Standard recording process is then performed without recording seamless-playable data.

If it is determined in step S202 that additional writing is possible, processing proceeds to step S203. It is determined in step S203 whether the seamless information is recorded on the memory 107. If it is determined in step S204 that the seamless information is recorded on the memory 107, the seamless information is acquired from the memory 107. The data recording process using the seamless information is performed.

The data processor 106 acquires the seamless information from the memory 107, and notifies the encoder 102 of the seamless information. The encoder 102 performs the encode process based on the seamless information, namely, with last buffer amount of the internal buffer (STD buffer) 121 set as the initial value. The data processor 106 performs the conversion process to the MPEG2-TS with the PTS, DTS and SCR of the video and audio contained in the seamless information set as the initial value, thereby recording data with seamless playing enabled.

If it is determined in step S204 that the seamless information is not recorded on the memory 107, processing proceeds to step S205. The clip information file corresponding to a clip having undergone last recording process is acquired. It is then determined if the seamless information is stored on the acquired clip information file. The specific recording destination of the seamless information is the maker private data block [MakersPrivateData( )] in the extension data block of the clip information file discussed with reference to FIGS. 8 through 11. If the seamless information is not stored in the clip information file, the seamless information cannot be used. Processing proceeds to step S211 to perform the standard recording process without using the seamless information.

If it is determined in step S205 that the seamless information is recorded in the clip information file corresponding to the clip having undergone last recording process, processing proceeds to step S206. The effectiveness of the acquired seamless information is determined. Only if the seamless information is determined to be effective, processing proceeds to step S212. The recording process of information is performed with the seamless information acquired from the clip information file applied in a manner that permits seamless playing.

Effective determination processes of the seamless information in step S206 include the following processes:

(1) Verification Process of the Maker ID and the Maker Model Code

The maker ID and the maker model code of the apparatus having performed the information recording process recorded in one of the clip information file, the index file and the play list file are acquired. It is then determined whether the maker ID and the maker model code match the maker ID and the maker model code of own apparatus.

This process verifies that the apparatus having performed last data recording and the apparatus going to record seamless-playable information are the same model produced by the same manufacturer. If the maker IDs and the maker model codes are identical to each other, it is possible to record seamless-playable information. Processing proceeds to step S212. In this case, the seamless information is determined to be effective, and processing proceeds to step S212. The recording process with the seamless information applied is thus performed. If the IDs and the codes fail to match to each other, the seamless information is determined to be non-effective. Processing proceeds to step S211. The standard recording process is performed with no seamless information applied.

(2) Verification Process with a Data Error Detection Code

An error detection code, such as a parity code or a checksum code, is acquired from the file containing the seamless information. The authenticity of the file is thus determined based on the error detection code. The file set in the directory of FIG. 7 is accompanied by the error detection code such as the parity code or the checksum code. In step S206, the data processor 106 acquires the error detection code such as the parity code or the checksum data set in the file recording the seamless information. The data processor 106 then checks the file for any error or alteration.

If the data processor 106 verifies that the file is error free or alteration free, the seamless information is determined to be effective. Processing proceeds to step S212. The recording process is thus performed with the seamless information applied. If the data processor 106 determines that the file is in error or altered, the seamless information is determined to be not effective. Processing proceeds to step S211, and the standard recording process is performed with no seamless information applied.

If processing proceeds from step S216 to step S212, the data processor 106 acquires the seamless information from the clip information file and notifies the encoder 102 of the seamless information. The encoder 102 performs the encode process based on the seamless information with last buffer amount of the internal buffer (STD buffer) 121 set as the initial value. The data processor 106 performs the conversion process to the MPEG2-TS with the PTS, DTS and SCR of the video and audio contained in the seamless information set as the initial value, thereby recording data with seamless playing enabled.

Figure 18:
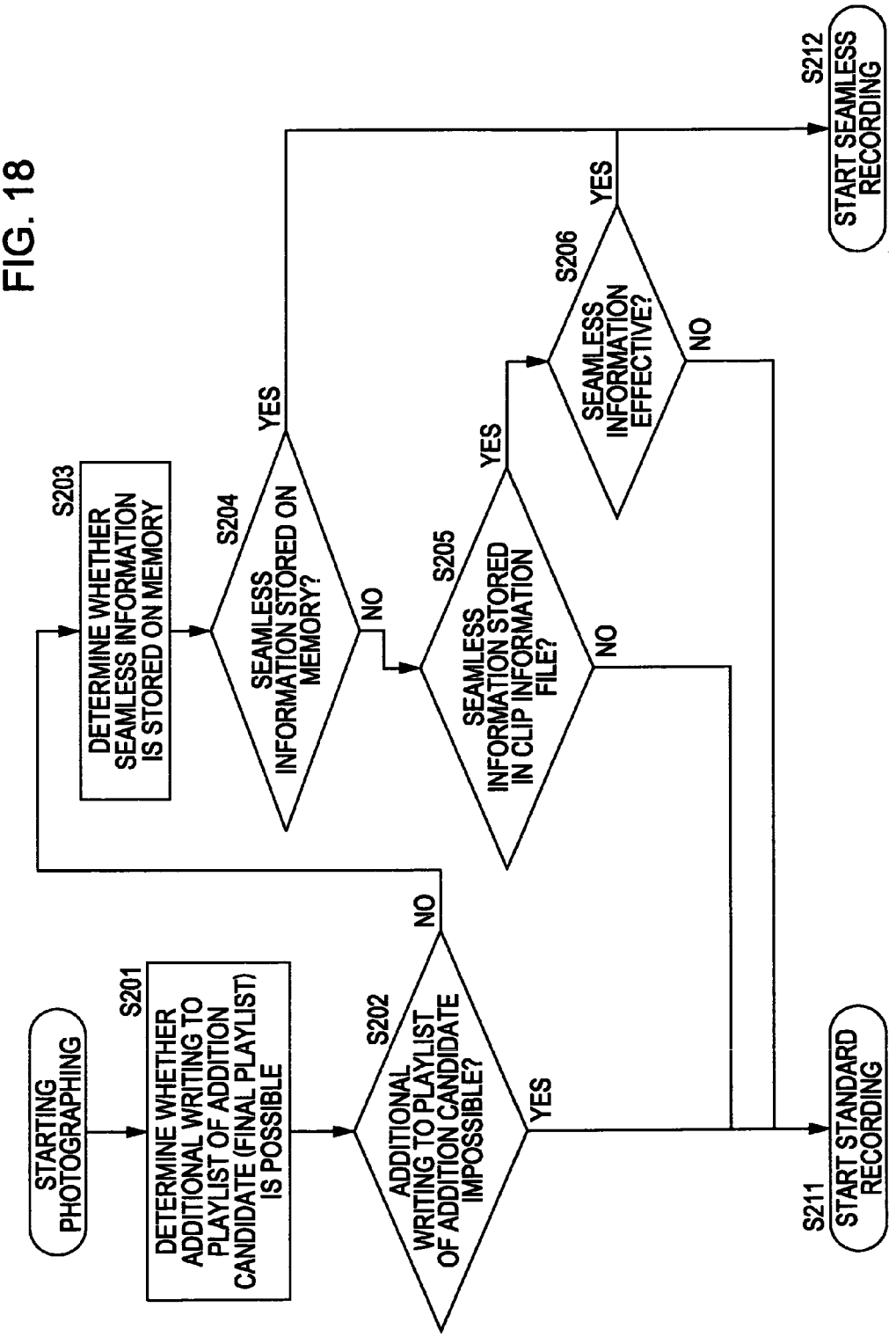
FIG. 18 is a flowchart illustrating a data recording process sequence performed by the information processing apparatus.

In the flowchart of FIG. 18, the recording destination of the seamless information is the clip information file. As previously discussed, a variety of recording destinations can be set including:

(a) clip information file,
(b) index file,
(c) play list file, and
(d) movie object file, and depending on the recording destination, an acquisition source is determined.

The information processing apparatus of the present invention such as a video camera performs the recording process. In the recording process, the seamless information is recorded in the data file defined by the record format of the content. The seamless information remains present as long as the content recorded on the information recording medium is left undeleted. The information processing apparatus can read and use the seamless information at any time. The seamless information is reliably acquired, and a content permitting seamless playing is always recorded.

[5. Structure of the Information Processing Apparatus]

Figure 19:
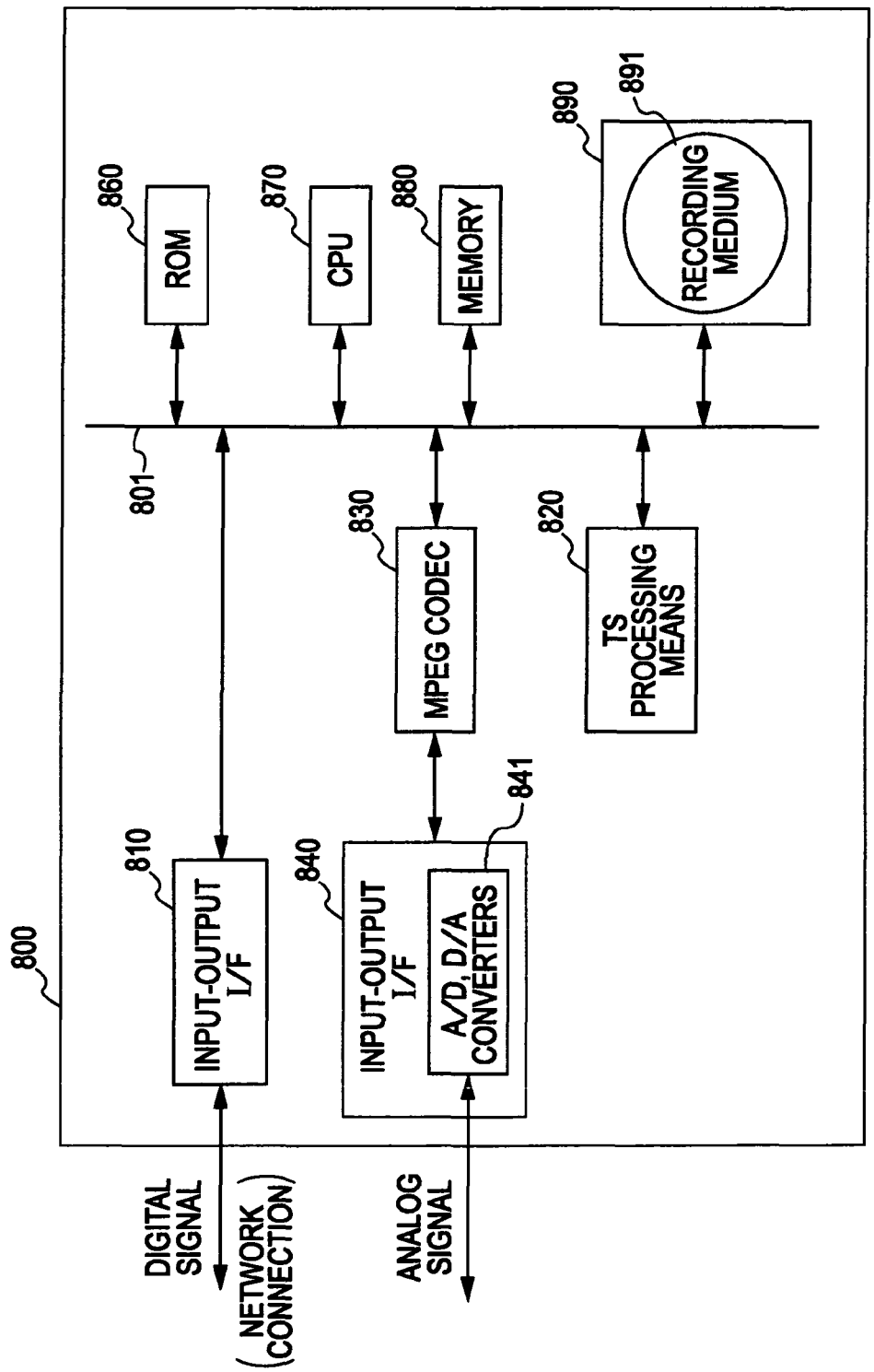
FIG. 19 illustrates a structure of the information processing apparatus.

FIG. 19 illustrates a hardware structure of the information processing apparatus. The information processing apparatus having the information recording medium processes the data, thereby performing the data recording process. An information processing apparatus 800 includes a drive 890 for driving a recording medium 891 to output a record signal and input a play signal, a CPU 870 for processing data in accordance with a variety of programs, a ROM 860 as a recording area for a program and parameters, a memory 880, an input-output I/F 810 for input and outputting digital signals, an input-output I/F 840 having A/D and D/A converts 841 for inputting and outputting analog signals, an MPEG codec 830 for performing an encode process and a decode process on MPEG data, TS processing means 820 for performing TS (Transport Stream) process and a bus 801 interconnecting all these elements.

The data recording process is described below. One of two signals, namely, a digital signal and an analog signal may be input. The digital signal may be input via the input-output I/F 810, and is converted into storage format data through the MPEG codec 830, the CPU 870 and the TS processing means 820. The resulting data is stored on the recording medium 891.

The analog signal is input to the input-output I/F 840. The A/D and D/A converters 841 convert the analog signal into a digital signal. The MPEG codec 830 codec converts the digital signal. The TS processing means 820 converts the output from the MPEG codec 830 into data in the record format and then stores the resulting data onto the recording medium 891.

A program for executing the information recording process is stored on the ROM 860. In the middle of the execution of the program, a memory 880 is used to store parameters and data and serves as a working area.

The present invention has been discussed in detail with reference to the particular embodiments. The embodiments of the present invention can be changed or modified without departing from the scope of the present invention. The embodiments of the present invention have been discussed for exemplary purposes only, and the present invention is not intended to limit to the disclosed embodiments. The scope of this invention is determined solely by reference to the claims.

The series of process steps described in this specification may be performed using hardware, software or a combination thereof. If the process steps are performed using software, a program of the software may be installed on a computer mounted in a dedicated hardware or may be installed on a general-purpose computer that can execute a variety of processes.

The program may be pre-stored on a recording medium such as a hard disk or a ROM (Read Only Memory). The program may also be temporarily or permanently stored on a removable recording medium such as one of a flexible disk, a CD-ROM (Compact Disc Read Only Memory), MO (Magneto-optical) disk, a DVD (Digital Versatile Disc), a magnetic disk and a semiconductor memory. The removable recording medium may be supplied as package software.

The program may be installed from the above-described removable recording medium to the computer. The program may be transmitted from a download site to the computer in a wireless fashion or via a network such as LAN (Local Area Network) and the Internet in a wired fashion. The computer receives and installs the program onto a recording medium such as an internal hard disk.

The variety of processes described in this specification are not only performed in the time-series order described above but also in parallel or separately depending on the throughput of the apparatus performing the processes. The word system in this specification refers to a logical set of a plurality apparatuses and does not mean elements contained in the same housing.

Industrial Applicability

In accordance with the present invention, the information processing apparatus such as the video camera records data in a manner that permits contents having discontinued recording timings to be played in a seamless fashion. To this end, the information processing apparatus acquires the seamless information of a preceding record content to be applied to a recording process of a subsequent record content, and records the seamless information in a record file defined by the record format. For example, the seamless information is recorded in the clip information file. The seamless information remains recorded on the information recording medium as long as the content recorded on the information recording medium remains undeleted. The information processing apparatus can thus read and use the seamless information at any time. With this arrangement, the seamless information is reliably acquired and contents are always recorded in a manner that permits seamless playing.

The invention claimed is:

1. An information processing apparatus for recording a record content onto an information recording medium, comprising:
   an encoder for performing an encoding operation on the record content,
   a data processor for performing a conversion operation for converting encoded data on the encoder into recorded data having a predetermined record format, the data processor creating, in addition to the recorded data, one or more record files associated with the recorded data as defined by the predetermined record format, and
   a recording processor for recording, onto the information recording medium, the recorded data having the predetermined record format and the one or more record files associated with the recorded data,
   the data processor being configured to create apparatus-specific seamless information from the recorded data for application to a discontinuous irregularly-timed recording operation of a different record content, and being configured to record the apparatus-specific seamless information into the information recording medium as part of the one or more record files associated with the recorded data,
   wherein the information processing apparatus selectively records the apparatus-specific seamless information in at least one of a clip information file, a play list file, an index file, and a movie object file, the record structure of the apparatus-specific seamless information is based on the type of file in which the information is recorded, and the structure differs from file type to file type among the file types of clip information file, play list file, index file, and movie object file.

2. The information processing apparatus according to claim 1, wherein the apparatus-specific seamless information comprises accumulated data amount information of an internal buffer of the encoder at the end of the encoding operation on the record content.

3. The information processing apparatus according to claim 1, wherein the apparatus-specific seamless information comprises time stamp information associated with the recorded data.

4. The information processing apparatus according to claim 3, wherein the record format is a MPEG format and the timestamp information comprises a presentation time stamp (PTS), a decoding time stamp (DTS), and a system clock reference time stamp (SCR).

5. The information processing apparatus according to claim 1, wherein the record content is AV stream data, and wherein the data processor controls the conversion operation, converting the AV stream data into recorded data comprising an AV stream file of the AV stream data having a predetermined unit, and creating the one or more record files including an attribute file mapping play time information of the AV stream file to address information, a play list file composed of at least one piece of play period data specifying a play period of the AV stream data by a start point and an end point, and, recording the apparatus-specific seamless information as part of the attribute file.

6. The information processing apparatus according to claim 1, wherein the record content is AV stream data, and wherein the data processor controls the conversion operation, converting the AV stream data into recorded data comprising an AV stream file of the AV stream data having a predetermined unit, and creating the one or more record files including an attribute file mapping play time information of the AV stream file to address information, a play list file composed of at least one piece of play period data specifying a play period of the AV stream data by a start point and an end point, and, recording the apparatus-specific seamless information as part of the play list file.

7. The information processing apparatus according to claim 1, wherein the one or more record files include an index file associated with the recorded data, and the data processor records the apparatus-specific seamless information as part of the index file into a directory on the information recording medium.

8. The information processing apparatus according to claim 1, wherein the one or more record files include a play file containing a set of commands for controlling playing of the recorded data, and the data processor records the apparatus-specific seamless information as part of the play file into a directory on the information recording medium.

9. The information processing apparatus according to claim 1, wherein at least one of the one or more record files include a manufacturer-specific data area, and the data processor records the apparatus-specific seamless information as part of the manufacturer-specific data area on the information recording medium.

10. The information processing apparatus according to claim 9, wherein the data processor performs an effectiveness verification process of the seamless information during the future irregularly-timed recording operation of the different record content, and controls the future irregularly-timed recording operation in accordance with the seamless information on condition that the effectiveness of the seamless information has been verified, wherein the effectiveness verification process of the apparatus-specific seamless information includes determining whether the manufacturer identification information stored in the manufacturer specific data area of the one or more record files matches a manufacturer identification associated with the information processing apparatus.

11. An information processing method of an information processing apparatus for recording a record content onto an information recording medium, comprising:

performing an encoding operation on the record content with an encoder, converting the data encoded in the encoding step into recorded data having a predetermined record format, and creating, in addition to the recorded data, one or more record files associated with the recorded data as defined by the predetermined record format;

recording onto the information recording medium, with a record processor, the recorded data having the predetermined record format and the one or more record files associated with the recorded data, and acquiring apparatus-specific seamless information from the recorded data for application to a discontinuous irregularly-timed recording operation of a different record content, and recording the seamless information as part of the one or more record files associated with the recorded data, wherein the information processing apparatus selectively records the apparatus-specific seamless information in at least one of a clip information file, a play list file, an index file, and a movie object file, the record structure of the apparatus-specific seamless information is based on the type of file in which the information is recorded, and the structure differs from file type to file type among the file types of clip information file, play list file, index file, and movie object file.

12. The information processing method according to claim 11, wherein the apparatus-specific seamless information comprises accumulated data amount information of an internal buffer of the encoder at the end of the encoding operation on the record content.

13. The information processing method according to claim 11, wherein the apparatus-specific seamless information comprises time stamp information associated with the recorded data.

14. The information processing method according to claim 13, wherein the record format is a MPEG format and the timestamp information comprises a presentation time stamp (PTS), and a decoding time stamp (DTS) and a system clock reference (SCR) as reference time information.

15. The information processing method according to claim 11, wherein creating the one or more record files associated with the recorded data includes creating an attribute file associated with the recorded data, and recording the apparatus-specific seamless information as part of the one or more record files includes recording the apparatus-specific seamless information as part of the attribute file.

16. The information processing method according to claim 11, wherein creating the one or more record files associated with the recorded data includes creating a playlist file associated with the recorded data, and recording the apparatus-specific seamless information as part of the one or more record files includes recording the apparatus-specific seamless information as part of the playlist file.

17. The information processing method according to claim 11, wherein creating the one or more record files associated with the recorded data includes creating an index file associated with the recorded data, and recording the apparatus-specific seamless information as part of the one or more record files includes recording the apparatus-specific seamless information as part of the index file.

18. The information processing method according to claim 11, wherein at least one of the one or more record files associated with the recorded data includes a manufacturer-specific data area, and recording the apparatus-specific seamless information as part of the one or more record files includes recording the apparatus-specific seamless information into the manufacturer-specific data area.

* * * * *